United States Patent
Takeuchi

(10) Patent No.: US 10,579,993 B2
(45) Date of Patent: Mar. 3, 2020

(54) INFORMATION PROCESSING DEVICE, INFORMATION PROCESSING METHOD, AND PROGRAM

(71) Applicant: Sony Corporation, Tokyo (JP)

(72) Inventor: Yasuo Takeuchi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/176,785

(22) Filed: Jun. 8, 2016

(65) Prior Publication Data

US 2016/0283267 A1    Sep. 29, 2016

Related U.S. Application Data

(63) Continuation of application No. 14/402,189, filed as application No. PCT/JP2013/061254 on Apr. 16, 2013.

(30) Foreign Application Priority Data

May 31, 2012    (JP) .................................. 2012-125209

(51) Int. Cl.
   *G06Q 20/34*    (2012.01)

(52) U.S. Cl.
   CPC ....... *G06Q 20/352* (2013.01); *G06Q 20/3552* (2013.01); *G06Q 20/3563* (2013.01); *G06Q 20/3574* (2013.01)

(58) Field of Classification Search
   CPC . G06F 9/4843; G06F 8/62; G06F 8/61; G06F 21/77; G06Q 20/352; G06Q 20/34
   See application file for complete search history.

(56) References Cited

U.S. PATENT DOCUMENTS

| | | |
|---|---|---|
| 5,155,857 A | 10/1992 | Kunisaki et al. |
| 8,196,131 B1 | 6/2012 | von Behren et al. |
| 2002/0040936 A1 | 4/2002 | Wentker et al. |
| 2003/0182569 A1 | 9/2003 | Matsuzaki et al. |
| 2005/0188360 A1 | 8/2005 | de Jong |
| 2005/0191968 A1 | 9/2005 | Tabayashi et al. |

(Continued)

FOREIGN PATENT DOCUMENTS

| | | |
|---|---|---|
| JP | 2002-366914 A | 12/2002 |
| JP | 2003-263332 A | 9/2003 |

(Continued)

OTHER PUBLICATIONS

International Search Report corresponding to PCT/JP2013/061254, dated Jul. 23, 2013, 3 pgs.

(Continued)

*Primary Examiner* — Brian W Wathen
(74) *Attorney, Agent, or Firm* — Lerner, David, Littenberg, Krumholz & Mentlik, LLP

(57) ABSTRACT

There is provided an information processing device including a storage unit configured to store applications, application information corresponding to each of the applications, and state management information in which the application information is stored in association with a priority level, and a control unit configured to control a valid state and an invalid state of the application by managing the application information stored in the state management information based on a process command.

14 Claims, 21 Drawing Sheets

(56) References Cited

U.S. PATENT DOCUMENTS

| | | | |
|---|---|---|---|
| 2007/0044098 A1 | 2/2007 | Ishimura et al. | |
| 2008/0081672 A1 | 4/2008 | Miyamoto | |
| 2010/0190437 A1* | 7/2010 | Buhot | H04B 5/06 |
| | | | 455/41.1 |
| 2011/0007091 A1* | 1/2011 | Homma | G06F 3/1431 |
| | | | 345/619 |
| 2011/0009091 A1 | 1/2011 | Aoki | |
| 2011/0093813 A1 | 4/2011 | Watanabe | |
| 2011/0138390 A1 | 6/2011 | Takeuchi | |
| 2012/0163279 A1* | 6/2012 | Tran | H04Q 9/00 |
| | | | 370/312 |

FOREIGN PATENT DOCUMENTS

| | | |
|---|---|---|
| JP | 2005-242445 A | 9/2005 |
| JP | 2009-277106 A | 11/2009 |
| JP | 2010-061540 A | 3/2010 |
| JP | 2011-118837 A | 6/2011 |
| WO | 2005073843 A1 | 8/2005 |
| WO | 2009/110448 A1 | 9/2009 |
| WO | 2011155578 A1 | 12/2011 |

OTHER PUBLICATIONS

Singapore International Search Report and Written Opinion for SG Application No. 11201407716U, dated Nov. 17, 2015.
Extended European Search Report for EP Application No. 13796905.1, dated Jan. 7, 2016.
Chinese Office Action for Application No. 201380026744.4 dated Jan. 9, 2017.
Japanese Office Action for Application No. 2014-518333 dated Dec. 6, 2016.

* cited by examiner

| Tag | Len | Value Description | | | | |
|---|---|---|---|---|---|---|
| 'A0' | '23' | Protocol Parameter Data | | | | |
| | | Tag | Len | Value Description | | |
| | | '80' | '18' | The 1st System specific parameters | | |
| | | | | Tag | Len | Value |
| | | | | '90' | '02' | '0001' |
| | | | | '91' | '08' | '02FE000000000000' |
| | | | | '92' | '08' | 'FFFFFFFFFFFFFFFF' |
| | | | | '93' | '01' | '00' |
| | | '81' | '00' | The 2nd System | | |
| | | '82' | '00' | The 3rd System | | |
| | | '83' | '00' | The 4th System | | |

B ⤴

| Sc | PID(IDm) | RTD(PMm) | MF | AID |
|---|---|---|---|---|
| 0001 | 02FE000000000000 | FFFFFFFFFFFFFFFF | 00: TRUE | AID-A |
| | | | | |
| | | | | |
| | | | | |

|   | SC   | AID  | IDm | PMm | MF |
|---|------|------|-----|-----|----|
| 1 | 0003 | 1111 | 11  | FF  | T  |
| 2 | FE00 | 2222 | 22  | FF  | T  |
| 3 |      |      |     |     |    |
| 4 |      |      |     |     |    |

B

|   | SC   | AID  | IDm | PMm | MF |
|---|------|------|-----|-----|----|
| 1 | 0003 | 1111 | 11  | FF  | T  |
| 2 | FE00 | 2222 | 22  | FF  | T  |
| 3 | 12FC | 3333 | 33  | FF  | F  |
| 4 |      |      |     |     |    |

FIG. 18

|   | SC   | AID  | IDm | PMm | MF |
|---|------|------|-----|-----|----|
| 1 | 0003 | 1111 | 11  | FF  | T  |
| 2 | FE00 | 2222 | 22  | FF  | T  |
| 3 | 12FC | 3333 | 33  | FF  | F  |
| 4 | FFEE | 4444 | 44  | FF  | F  |

|   | SC   | AID  | IDm | PMm | MF |
|---|------|------|-----|-----|-----|
| 1 | 0003 | 1111 | 11  | FF  | T  |
| 2 | FE00 | 2222 | 22  | FF  | T  |
| 3 | 12FC | 3333 | 33  | FF  | F  |
| 4 |      |      |     |     |    |

B

|   | SC   | AID  | IDm | PMm | MF |
|---|------|------|-----|-----|-----|
| 1 | 0003 | 1111 | 11  | FF  | T  |
| 2 | 12FC | 3333 | 22  | FF  | T  |
| 3 |      |      |     |     |    |
| 4 |      |      |     |     |    |

INFORMATION PROCESSING DEVICE, INFORMATION PROCESSING METHOD, AND PROGRAM

CROSS-REFERENCE TO RELATED APPLICATION

The present application is a continuation of U.S. patent application Ser. No. 14/402,189, filed Nov. 19, 2014, which is a national phase entry under 35 U.S.C. § 371 of International Application No. PCT/JP2013/061254 filed Apr. 16, 2013, published on May 12, 2013 as WO 2013/179791 A1, which claims priority from Japanese Patent Application No. JP 2012-125209 filed in the Japanese Patent Office on May 31, 2012.

TECHNICAL FIELD

The present disclosure relates to an information processing device, an information processing method, and a program.

BACKGROUND ART

In recent years, for example, information processing devices capable of executing contactless communication with readers/writers (or information processing devices having reader/writer functions; the same applies below), such as cellular phones on which contactless integrated circuit (IC) cards or contactless IC chips are mounted, have been proliferated. Information processing devices such as reader/writers, IC cards, or cellular phones use, for example, magnetic fields (carrier waves) of predetermined frequencies such as 13.56 [MHz] in communication. Specifically, in communication between readers/writers and information processing devices, the readers/writers transmit carrier waves on which carrier-wave signals are loaded and the information processing devices such as IC cards receiving the carrier waves through antennas send response signals to the received carrier-wave signals through load modulation.

In Near Field Communication (NFC) in which communication is executed using carrier waves of predetermined frequencies such as 13.56 [MHz], as described above, for example, there are various communication schemes such as "ISO/IEC 18092 Type F," "ISO/IEC 14443 Type A," and "ISO/IEC 14443 Type B." Further, some information processing devices include, for example, operating systems (hereinafter referred to as "OSs" in some cases) such as dual cards corresponding to respective communication schemes to correspond to a plurality of communication schemes or communication standards.

In such circumstances, technologies have been developed for executing processes corresponding to a plurality of communication schemes or standards normally. For example, even when a message structure in contact communication with an external device is different from a message structure in contactless communication with an external device, a technology disclosed in Patent Literature 1 can be exemplified as a technology for enabling a process corresponding to the structures of received messages. Further, for example, a technology disclosed in Patent Literature 2 can be exemplified as a technology of executing a command from an external device in an application imitating an OS operating a different execution environment from a normal environment without changing a specification of the command from the external device.

CITATION LIST

Patent Literature

Patent Literature 1: JP 2005-242445A
Patent Literature 2: JP 2011-118837A

SUMMARY OF INVENTION

Technical Problem

As one method of causing an information processing device to correspond to a plurality of communication schemes or communication standards, for example, an information processing device includes a plurality of OSs such as "FeliCa (registered trademark) OS" and "Java Card (registered trademark) OS" as in a dual card (for example, a configuration corresponding to FIG. 1A to be described below). However, when the one method is used, a plurality of OSs have to be mounted on an information processing device.

As another method of causing an information processing device to correspond to a plurality of communication schemes or communication standards, for example, a method in which an information processing device includes one OS and functions of OSs corresponding to communication schemes other than the communication scheme to which the OS corresponds are realized as applications can be considered (for example, a configuration corresponding to FIG. 1B to be described below). As described above, when the method of realizing functions of OSs corresponding to communication schemes other than a communication scheme to which one OS corresponds is used as an application, an information processing device can be caused to correspond to a plurality of communication schemes or communication standards despite the fact that a plurality of OSs are not mounted on the information processing device.

However, when the functions of the OSs corresponding to the communication schemes other than the communication scheme to which the OS corresponds are realized as applications, for example, a restriction may be imposed on installation of an application (addition of an application) such as an applet since the communication schemes are different. For example, when a function of an OS, such as "ISO/IEC 18092 Type F," corresponding to a communication scheme of managing information regarding an installed application in a table is realized by an application, for example, there is a concern that an application that a user desires to install may not be installed due to, for example, restriction (restriction on the number of recordable applications) on information regarding an application such as an applet recordable on the table.

In embodiments of the present disclosure, it is desirable to provide a novel and improved information processing device, a novel and improved information processing method, and a novel and improved program capable of controlling an installed application such that a valid state and an invalid state of the application are controlled.

Solution to Problem

According to the present disclosure, there is provided an information processing device including a storage unit configured to store applications, application information corresponding to each of the applications, and state management information in which the application information is stored in association with a priority level, and a control unit configured to control a valid state and an invalid state of the application by managing the application information stored in the state management information based on a process command According to the present disclosure, there is provided an information processing device including a storage unit configured to store applications, application information corresponding to each of the applications, and state management information in which the application information is stored in association with a priority level, a control unit configured to control a valid state and an invalid state of the application by managing the application information stored in the state management information, a communication unit configured to execute contactless communication with an external device, and an operation unit configured to be operable by a user. The control unit controls the valid state and the invalid state of the application based on a process command received from the external device by the communication unit or a process command which is based on a user's operation transmitted from the operation unit.

According to the present disclosure, there is provided an information processing device including a storage unit configured to store state management information in which application information is stored in association with a priority level, and a control unit configured to control a valid state and an invalid state of the application by managing the application information stored in the state management information based on a process command According to the present disclosure, there is provided an information processing method including a step of controlling valid states and invalid states of applications by managing, based on a process command, application information stored in state management information which is stored in a storage unit configured to store the applications, the application information corresponding to each of the applications, and the state management information in which the application information is stored in association with a priority level.

According to the present disclosure, there is provided a program for causing a computer to execute a step of controlling valid states and invalid states of applications by managing, based on a process command, application information stored in state management information which is stored in a storage unit configured to store the applications, the application information corresponding to each of the applications, and the state management information in which the application information is stored in association with a priority level.

Advantageous Effects of Invention

According to embodiments of the present disclosure, it is possible to control an installed application such that a valid state and an invalid state of the application are controlled.

BRIEF DESCRIPTION OF DRAWINGS

FIG. 13 is an explanatory diagram illustrating an example of a process related to update of the state management information in the information processing device according to the embodiment.

FIG. 16 is an explanatory diagram illustrating an example of a process related to update of the state management information in the information processing device according to the embodiment.

FIG. 18 is an explanatory diagram illustrating an example of a process related to update of the state management information in the information processing device according to the embodiment.

FIG. 20 is an explanatory diagram illustrating an example of a process related to update of the state management information in the information processing device according to the embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will be made in the following order.

1. Information processing method according to embodiment
2. Information processing device according to embodiment
3. Program according to embodiment (Information Processing Method According to Embodiment)

An information processing method according to an embodiment will be described before the configuration of an information processing device according to the embodiment is described. Hereinafter, the description will be made assuming that the information processing device according to the embodiment executes a process related to the information processing method according to the embodiment.

Figure 1A:
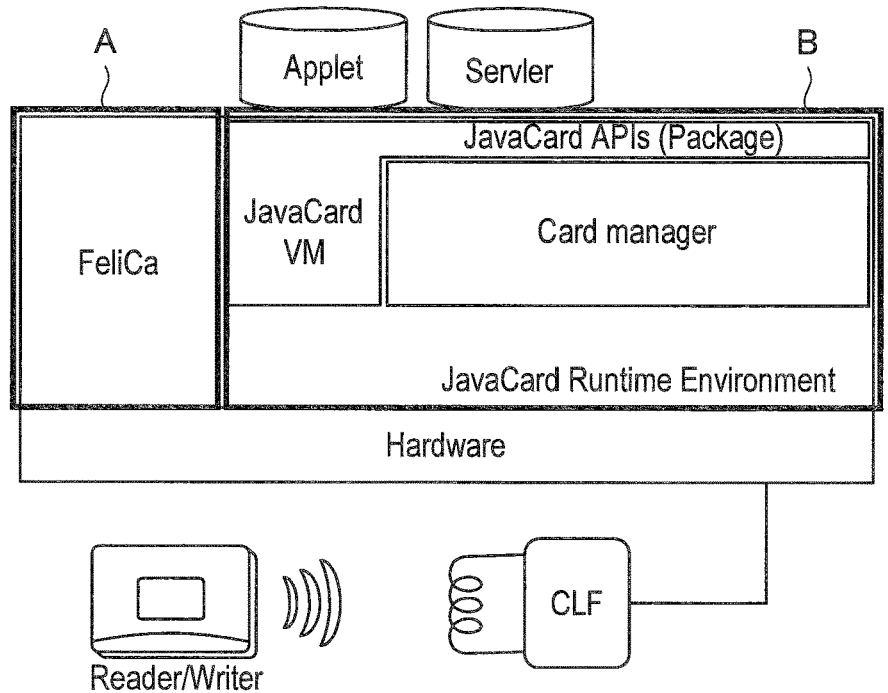
FIG. 1A is an explanatory diagram illustrating a process related to an information processing method in an information processing device according to an embodiment.
Figure 1B:
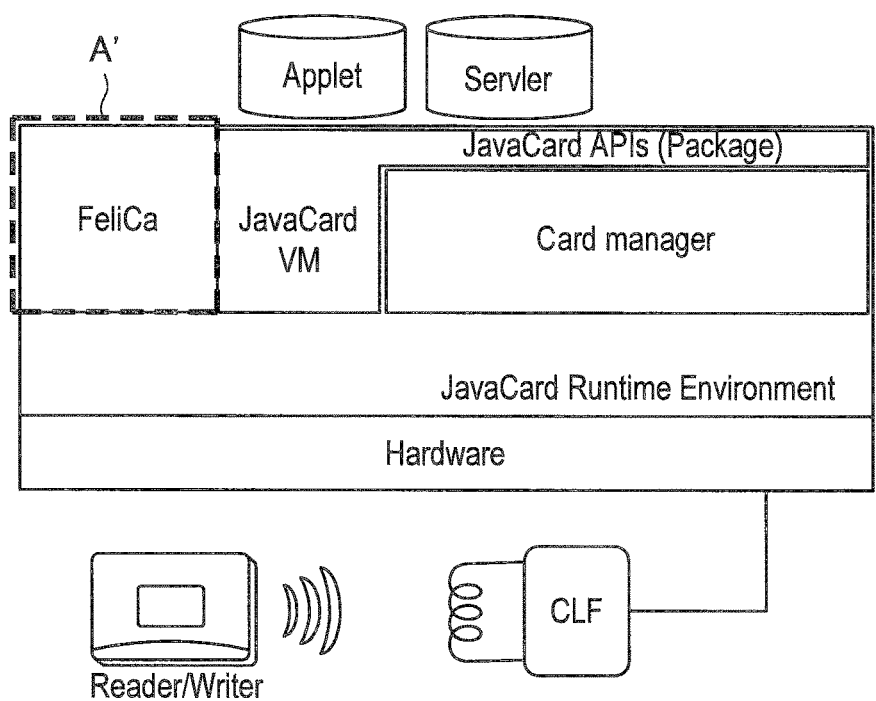
FIG. 1B is an explanatory diagram illustrating a process related to an information processing method in an information processing device according to an embodiment.

FIGS. 1A and 1B are explanatory diagrams illustrating processes related to information processing methods in information processing devices according to the embodiment. Here, FIG. 1A illustrates an overview of a configuration corresponding to one method of causing an information processing device to correspond to the plurality of communication schemes or communication standards described above and illustrates an example of a case in which the information processing device includes a plurality of OSs so that the information processing device is caused to correspond to the plurality of communication schemes or communication standards. FIG. 1B illustrates an overview of a configuration corresponding to another method of causing an information processing device to correspond to the plurality of communication schemes or communication standards described above and illustrates an example of a case in which functions of OSs corresponding to the communication schemes other than the communication scheme to which the OS corresponds are realized by applications.

For example, as illustrated in FIG. 1A, the information processing device includes two OSs, i.e., "FeliCa (registered trademark) OS" (A illustrated in FIG. 1A) and "Java Card (registered trademark) OS" (B illustrated in FIG. 1A). Thus, a process corresponding to a communication scheme corresponding to "FeliCa (registered trademark) OS" and a process corresponding to a communication scheme corresponding to "Java Card (registered trademark) OS" can be executed by the single information processing device. However, in order to realize the configuration illustrated in FIG. 1A, the two OSs, i.e., "FeliCa (registered trademark) OS" and "Java Card (registered trademark) OS," have to be mounted on the information processing device.

For example, as illustrated in FIG. 1B, when the function of "FeliCa (registered trademark) OS" (A illustrated in FIG. 1A) illustrated in FIG. 1A is realized by an application (A' illustrated in FIG. 1B) having the function corresponding to "FeliCa (registered trademark) OS," the function of "FeliCa (registered trademark) OS" (A illustrated in FIG. 1A) can be realized on "Java Card (registered trademark) OS."

However, for example, as illustrated in FIG. 1B, when the function of "FeliCa (registered trademark) OS" (A illustrated in FIG. 1A) is realized on "Java Card (registered trademark) OS," as described above, for example, restriction may be imposed on the installation of an application (addition of an application) such as an applet.

Hereinafter, for example, a process related to the information processing method according to the embodiment in the information processing device according to the embodiment will be described exemplifying the case in which the function of "FeliCa (registered trademark) OS" (A illustrated in FIG. 1A) is realized on "Java Card (registered trademark) OS," as illustrated in FIG. 1B. A case in which the process related to the information processing method according to the embodiment is applicable is not limited to the case in which the function of "FeliCa (registered trademark) OS" (A illustrated in FIG. 1A) is realized on "Java Card (registered trademark) OS." For example, the information processing method according to the embodiment is applicable to a case in which a function of an OS corresponding to a communication scheme of managing information regarding an installed application in a table or the like is realized by an application.

[1] Overview of Information Processing Method According to Embodiment

The information processing device according to the embodiment controls installed applications such that the valid states (hereinafter referred to as "Activated" in some cases) of the application and the invalid states (hereinafter referred to as "Deactivated" in some cases) of the applications are provided and the valid states and the invalid states of the application are controlled. Here, the valid state of the application according to the embodiment refers to a state in which the installed application can be executed. Further, the invalid state of the application according to the embodiment refers to a state in which the installed application remains installed and is not executed.

In the information processing device according to the embodiment, for example, the valid state and the invalid state of the application are controlled by managing state management information, in which application information corresponding to an application (installed application) is stored with a priority level, based on a process command. Here, for example, as illustrated in FIG. 1B, when the function of "FeliCa (registered trademark) OS" (A illustrated in FIG. 1A) is realized on "Java Card (registered trademark) OS," the information processing device according to the embodiment can manage the state management information by executing, for example, a contactless registry service (CRS) application of "Java Card Runtime Environment." It is needless to say that the management of the state management information in the information processing device according to the embodiment is not limited to management realized by executing the CRS application.

Here, as the application information (data) according to the embodiment, system information (for example, a system code, which is hereinafter referred to as "SC" in some cases) for identifying a system in which an application is used can be exemplified. The application information according to the embodiment is not limited to the system information. For example, the application information according to the embodiment may include an application-unique ID (hereinafter referred to as "AID"), a manufacture ID (hereinafter referred to as "IDm"), a manufacture parameter (hereinafter referred to as "PMm"), and mode information (for example, a mode flag, which is hereinafter referred to "MF" in some cases) regulating whether a response to a polling signal is given.

The state management information according to the embodiment is referred to by a device (for example, the information processing device according to the embodiment or a device (or a system) including the information processing device according to the embodiment; the same applies below) executing an installed application. The device executing the installed application executes the application based on the application information stored in the state management information. That is, in the device executing an installed application, an application corresponding to the application information stored in the state management information can be executed. On the other hand, in the device executing an installed application, an application not corresponding to the application information stored in the state management information is not executed even when the application is an installed application. Accordingly, an application corresponding to the application information recorded in the state management information according to the embodiment is an application in the valid state according to the embodiment. Further, an application corresponding to the application information not recorded in the state management information according to the embodiment is an application in the invalid state according to the embodiment.

An example of the state management information according to the embodiment includes a table in which the application information is recorded with a priority level for each application. Here, when the state management information according to the embodiment is managed by a CRS application which is being executed, the table serving as the state management information according to the embodiment can be understood as one of "Contactless Registry Service Management Table."

In the state management information according to the embodiment, for example, the application information is recorded in a predetermined criterion unit (for example, a slot) and the upper limit (for example, the upper limit of the number of slots) of a storable data capacity is set in advance. In the state management information according to the embodiment, the upper limit of the storable data capacity may be changed. The state management information according to the embodiment is not limited to the table and may be, for example, RDB or data with any format in which the application information can be stored with a priority level for each application. Hereinafter, a case in which the state management information according to the embodiment is a table will be exemplified. Further, a specific example of the state management information according to the embodiment will be described below.

As the process command according to the embodiment, for example, a process command transmitted from an external device such as a server or a reader/writer or a process command based on a user's operation transmitted from an operation unit (to be described below) can be exemplified. Here, the information processing device according to the embodiment acquires a process command transmitted from an external device, for example, by causing a communication unit (to be described below) included in the information processing device according to the embodiment to receive a signal indicating the process command or acquiring a signal indicating the process command received by, for example, an external communication device such as a contactless front end (CLF) illustrated in FIGS. 1A and 1B from the external communication device.

More specifically, the information processing device according to the embodiment includes, for example, a storage unit (to be described below) and stores the state management information in the storage unit (to be described below). For example, when an application is installed, the information processing device according to the embodiment stores, for example, one or two or more applications (installed applications), application information corresponding to each of the applications, and the state management information in the storage unit (to be described below). Here, the application information corresponding to each application and stored in the storage unit (to be described below) is stored in the storage unit (to be described below), for example, when each application is stalled. That is, for example, when an application is not installed, the application (installed application) and the application information corresponding to this application are not stored in the storage unit (to be described below) in some states in the information processing device according to the embodiment.

When one application is set in the valid state, the information processing device according to the embodiment adds the application information corresponding to the one application to the state management information. By adding the application information corresponding to the one application to the state management information, the one application enters the valid state.

When one application is set in the invalid state, the information processing device according to the embodiment deletes the application information corresponding to the one application stored in the state management information from the state management information. By deleting the application information corresponding to the one application from the state management information, the one application enters the invalid state (a state in which the application is installed, but is not executed).

In the information processing device according to the embodiment, the process related to the management of the state management information is not limited to the foregoing process. For example, when the plurality of pieces of application information in which the content of the system information is the same are stored in the state management information, there is a concern that an undesirable situation may occur, for example, the device executing an installed application may not determine an application which is to be executed among the applications in which the content of the system information is the same and the device executing an installed application may execute an erroneous application.

Accordingly, the information processing device according to the embodiment restricts addition of the application information to the state management information based on the system information included in the application information corresponding to the application newly set in the valid state and the application information already stored in the state management information. More specifically, for example, when the system information included in the application information and corresponding to an application newly set in the valid state is included in the application information already stored in the state management information, the information processing device according to the embodiment does not add the application information corresponding to the application newly set in the valid state to the state management information.

For example, as described above, the information processing device according to the embodiment restricts the addition of the application information to the state management information. Thus, it is possible to prevent the system information included in the application information stored in the state management information from conflicting and prevent the above-described undesirable situation.

The information processing device according to the embodiment may combine a process related to deletion of the application information from the state management information and a process related to addition of the application information to the state management information. For example, the information processing device according to the embodiment can realize examples described in (A) and (B) below by combining the process related to the deletion of the application information from the state management information and the process related to the addition of the application information to the state management information.

(A) First Example of Process Related to Combination

The information processing device according to the embodiment can add any application information to the state management information by combining the process related to the deletion of the application information from the state management information and the process related to the addition of the application information to the state management information, for example, even when the plurality of pieces of application information including the same system information are stored in the storage unit (to be described below).

For example, when one application is in the valid state and the application information including the same system information as the system information included in the application information corresponding to the one application is already stored in the state management information, the information processing device according to the embodiment first deletes the already stored application information through the process related to the deletion of the application information from the state management information. The information processing device according to the embodiment adds the application information corresponding to the one application in the valid state to the state management information through the process related to the addition of the application information to the state management information.

For example, as described above, the information processing device according to the embodiment can permit a plurality of applications corresponding to the same system information to be installed and cause any application to enter the valid state by executing a process of combining the process related to the deletion of the application information from the state management information and the process related to the addition of the application information to the state management information. Accordingly, for example, a user can operate a user interface (UI) to switch and use an application when the plurality of applications corresponding to the same system information are installed. Accordingly, the information processing device according to the embodiment can improve convenience for the user.

(B) Second Example of Process Related to Combination

For example, the information processing device according to the embodiment can change the priority level associated with the application information stored in the state management information by combining the process related to the deletion of the application information from the state management information and the process related to the addition of the application information to the state management information.

For example, when the application information associated with a first priority level in the state management information is already stored and one application is newly set in the valid state in association with the first priority level, the information processing device according to the embodiment first deletes the application information associated with the first priority level and already stored through the process related to the deletion of the application information from the state management information. Further, the information processing device according to the embodiment may delete all of the application information (for example, the application information including the same system information) having an influence at the time of addition of the application information corresponding to the application newly set in the valid state.

The information processing device according to the embodiment adds the application information corresponding to the one application set in the valid state to the state management information in association with the first priority level through the process related to the addition of the application information to the state management information. The information processing device according to the embodiment adds the application information deleted through the process related to the deletion of the application information from the state management information, to the state management information through the process related to the addition of the application information to the state management information.

As described above, the information processing device according to the embodiment can change the priority level associated with the application information stored in the state management information by executing the process of combining the process related to the deletion of the application information from the state management information and the process related to the addition of the application information to the state management information.

Hereinafter, processes when an application is newly set in the valid state and an application is set in the invalid state will be described giving specific examples.

(1) Example of Process when Application is Newly Set in Valid State

Figure 2:
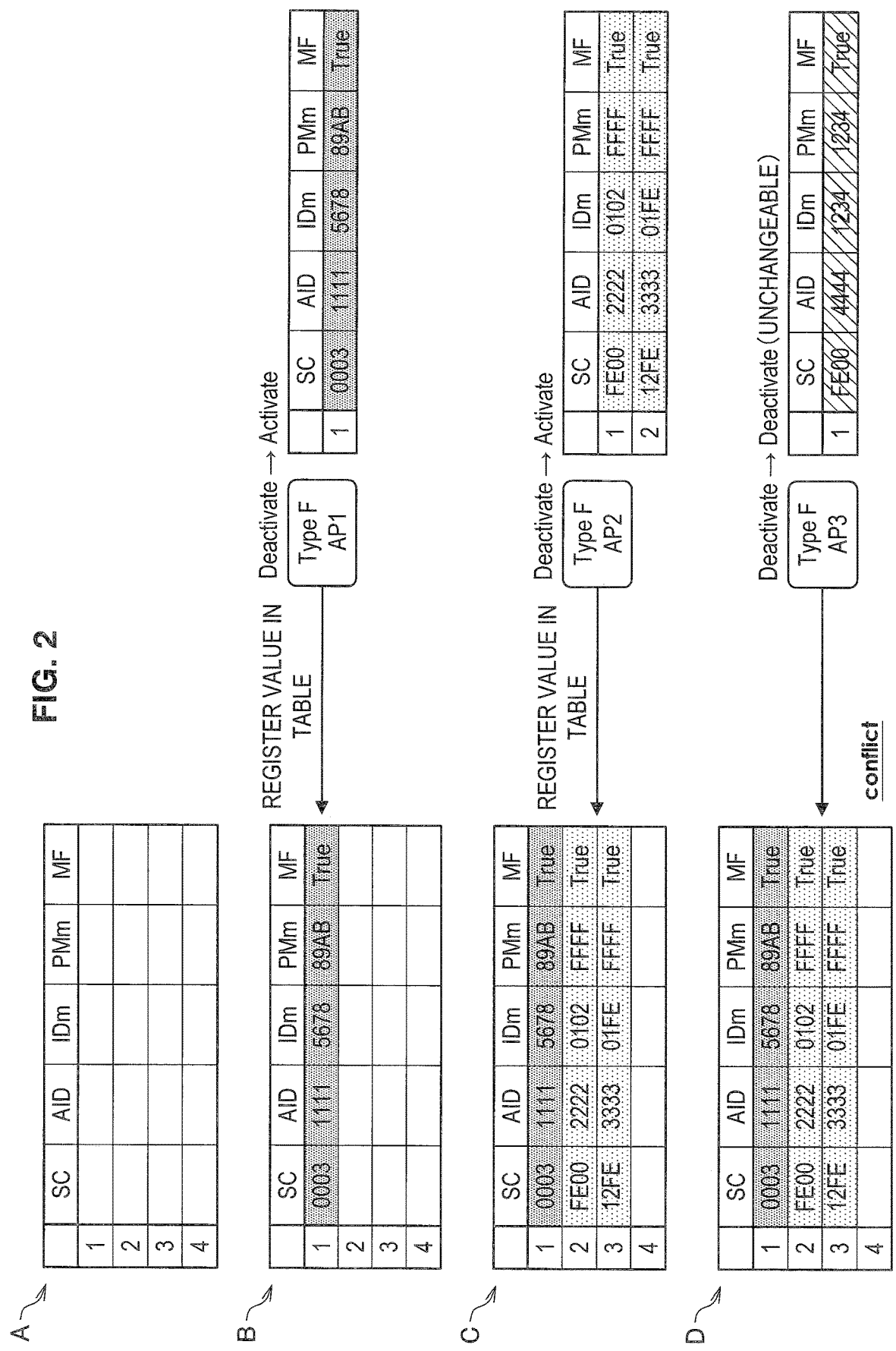
FIG. 2 is an explanatory diagram illustrating an example of a process related to an information processing method according to the embodiment.

FIG. 2 is an explanatory diagram illustrating an example of a process related to an information processing method according to the embodiment. Here, FIG. 2 illustrates an example of a process when an application of "ISO/IEC 18092 Type F" (hereinafter referred to as "Type F AP" in some cases) is added to the state management information, i.e., when an application is newly set in the valid state. A illustrated in FIG. 2 indicates an example of the state management information according to the embodiment and an example in which the state management information according to the embodiment is a table. Each of B to D illustrated in FIG. 2 indicates an example when the process related to the information processing method according to the embodiment is executed on the state management information indicated by A of FIG. 2. A table written on the right side of B illustrated in FIG. 2 indicates an example of the application information corresponding to "Type F AP1" and the application information corresponding to "Type F AP1" indicates data with a data capacity corresponding to one slot. A table written on the right side of C illustrated in FIG. 2 indicates an example of the application information corresponding to "Type F AP2" and the application information corresponding to "Type F AP2" indicates data with a data capacity corresponding to two slots. A table written on the right side of D illustrated in FIG. 2 indicates an example of the application information corresponding to "Type F AP3" and the application information corresponding to "Type F AP3" indicates data with a data capacity corresponding to one slot.

Here, FIG. 2 illustrates an example in which four slots are provided to store the application information in the state management information. However, the number of slots provided in the state management information according to the embodiment is not limited to the example illustrated in FIG. 2. Numbers "1" to "4" attached to rows of the state management information indicated by A of FIG. 2 correspond to the priority level associated with the application information to be stored (for example, "1" is the highest priority level and "4" is the lowest priority level). Hereinafter, the priority level number associated with the application information is indicated as a "slot number" in some cases.

The priority level in the state management information according to the embodiment corresponds to, for example, a reference priority level when a device executing an installed application refers to the state management information. More specifically, for example, when a device executing an installed application acquires a polling signal in which a number corresponding to the priority level is not designated, the device executing the installed application refers to the application information corresponding to "1." When a device executing an installed application acquires a polling signal in which a number corresponding to the priority level is designated, the device executing the installed application can refer to the application information corresponding to this number.

The information processing device according to the embodiment associates the priority level with the application information stored in the state management information, for example, in the following way.

Priority Level According to Application Installation Order

For example, the information processing device according to the embodiment gives a higher priority level when an application installation time is earlier. When an application is not installed and is merely loaded (read), the information processing device according to the embodiment stores a loaded time. When the application is installed, the information processing device according to the embodiment may set the priority level to be higher when the loaded time is earlier based on the stored loaded time.

Priority Level Based on Priority Set in Application

For example, the information processing device according to the embodiment gives a higher priority level to an application of which the set priority is high than an application of which the set priority is low.

The method of giving the priority level in the information processing device according to the embodiment is not limited to the foregoing examples.

For example, when a slot number is designated at the time of installation of an application, the information processing device according to the embodiment may permit the application to occupy a specific designated slot number. The case in which the slot number is designated at the time of installation of the application, as described above, refers to a case in which the system information corresponding to the application is designated to be stored in the designated slot number in the state management information.

More specifically, when "system information SC=0003 and Slot0" is designated at the time of the installation, for example, the information processing device according to the embodiment stores only an application with the system information "0003" included in the application information in the slot with slot number 0 in the state management information. That is, one or two or more providers (for example, service providers) providing the application corresponding to the system information "0003" are provided with a priority right to occupy a specific slot.

For example, when an application for which a slot number is designated at the time of the installation is uninstalled and deleted from the storage unit (to be described below) or the like, the information processing device according to the embodiment may permit the application information including the system information excluding "0003" to be stored in the slot with slot number 0 in the state management information.

Accordingly, in the information processing device according to the embodiment, the priority right to occupy a specific slot is controlled, for example, by installing an application or deleting the application. As described above, for example, the priority right to occupy a specific slot is controlled, so that a provider can ensure the priority right, for example, when "the provider to the user of the information processing device according to the embodiment=a provider of an application." Accordingly, as described above, for example, by controlling the priority right to occupy a specific slot, it is possible to provide a specific service provider or the like with a service of which the priority right can be given to the specific service provider or the like.

(1-1)

When a process command indicates that "Type F AP1" is set in the valid state, the information processing device according to the embodiment reads the application information corresponding to "Type F AP1" from, for example, the storage unit (to be described below). The information processing device according to the embodiment executes a process of adding (registering) the read application information corresponding to "Type F AP1" to the state management information illustrated by A of FIG. 2.

Here, in the state management information indicated by A of FIG. 2, the application information including the same system information as the system information (SC "0003" shown in B of FIG. 2) included in the application information corresponding to "Type F AP1" is not stored. Further, in the state management information indicated by A of FIG. 2, a free capacity of 1 slot corresponding to the application information corresponding to "Type F AP1" is present.

Accordingly, as illustrated in B of FIG. 2, for example, the application information corresponding to "Type F AP1" is stored in the state management information and "Type F AP1" enters the valid state.

(1-2)

When a process command indicates that "Type F AP2" is set in the valid state, the information processing device according to the embodiment reads the application information corresponding to "Type F AP2" from, for example, the storage unit (to be described below). The information processing device according to the embodiment executes a process of adding (registering) the read application information corresponding to "Type F AP2" to the state management information illustrated by B of FIG. 2.

Here, in the state management information indicated by B of FIG. 2, the application information including the same system information as the system information (SC "FE00," "12FE" shown in C of FIG. 2) included in the application information corresponding to "Type F AP2" is not stored. Further, in the state management information indicated by B of FIG. 2, a free capacity of 2 slots corresponding to the application information corresponding to "Type F AP2" is present.

Accordingly, as illustrated in C of FIG. 2, for example, the application information corresponding to "Type F AP2" is stored in the state management information and "Type F AP2" enters the valid state.

(1-3)

When a process command indicates that "Type F AP3" is set in the valid state, the information processing device according to the embodiment reads the application information corresponding to "Type F AP3" from, for example, the storage unit (to be described below). The information processing device according to the embodiment executes a process of adding (registering) the read application information corresponding to "Type F AP3" to the state management information illustrated by C of FIG. 2.

Here, in the state management information indicated by C of FIG. 2, the application information including the same system information as the system information (SC "FE00" shown in D of FIG. 2) included in the application information corresponding to "Type F AP3" is present.

Accordingly, as illustrated in D of FIG. 2, for example, the information processing device according to the embodiment does not add the application information corresponding to "Type F AP3." Thus, the application information corresponding to "Type F AP3" is not stored in the state management information and "Type F AP3" enters the invalid state.

For example, the information processing device according to the embodiment may notify the user that "Type F AP3" is in the invalid state since an application competing with "Type F AP3" is present in the valid application. Here, as a notification method according to the embodiment, the user is notified by, for example, a visual notification method of displaying text or an image on a display screen or an aural notification method of using an audio (including music or a beep sound and the same applies below), and a notification method of combining these methods. Examples of a target which the information processing device according to the embodiment causes to execute the notification include a display unit (to be described below), an audio output unit (to be described below) included in the self-device (the information processing device according to the embodiment), and/or an external device such as an external display device or an external audio output device.

When an application is newly set in the valid state, the information processing device according to the embodiment executes, for example, the same process as the process illustrated in FIG. 2. It is needless to say that the process in the information processing device according to the embodiment when an application is newly set in the valid state is not limited to the process illustrated in FIG. 2.

(2) Example of Process when Application is Set in Invalid State

Figure 3:
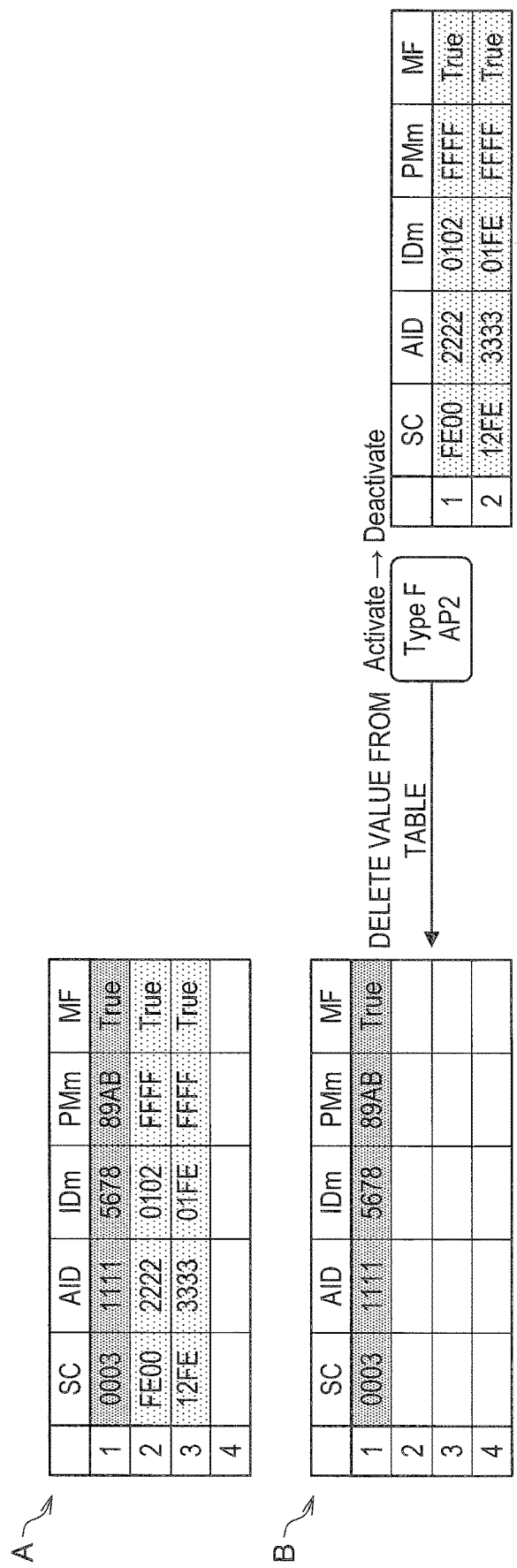
FIG. 3 is an explanatory diagram illustrating an example of a process related to an information processing method according to the embodiment.

FIG. 3 is an explanatory diagram illustrating an example of the process related to the information processing method according to the embodiment. Here, FIG. 2 illustrates an example of a process when "Type F AP" is deleted from the state management information, i.e., when an application is set in the invalid state. A illustrated in FIG. 3 indicates an example of the state management information and an example in which the same application information as that of D illustrated in FIG. 2 is stored. B illustrated in FIG. 3 indicates an example when the process related to the information processing method according to the embodiment is executed on the state management information indicated by A of FIG. 3.

When a process command indicates that "Type F AP2" is set in the invalid state, the information processing device according to the embodiment reads the application information corresponding to "Type F AP2" from, for example, the storage unit (to be described below). The information processing device according to the embodiment executes a process of deleting the read application information corresponding to "Type F AP2" from the state management information illustrated by B of FIG. 2.

Here, in the state management information indicated by B of FIG. 3, the same application information as the application information corresponding to "Type F AP2" is stored.

Accordingly, as illustrated in B of FIG. 2, for example, the application information corresponding to "Type F AP2" is deleted from the state management information and "Type F AP2" enters the invalid state.

When an application is newly set in the invalid state, the information processing device according to the embodiment executes, for example, the same process as the process illustrated in FIG. 3. It is needless to say that the process in the information processing device according to the embodiment when an application is set in the invalid state is not limited to the process illustrated in FIG. 3.

When the state management information is in the state shown in B of FIG. 3 and the process command indicates that "Type F AP3" indicated by D of FIG. 2 is set in the valid state, the application information corresponding to "Type F AP3" is stored in the state management information through the process when the application is newly set in the valid state in the information processing device according to the embodiment described above. Accordingly, when the state management information is in the state shown in B of FIG. 3 and the process command indicates that "Type F AP3" indicated by D of FIG. 2 is set in the valid state, the information processing device according to the embodiment can cause "Type F AP3" to enter the valid state.

The information processing device according to the embodiment manages the application information stored in the state management information, for example, by executing the process related to the addition (registration) of the application information to the state management information and the process related to the deletion of the application information from the state management information, as described above, as the process related to the information processing method according to the embodiment. Here, the state management information according to the embodiment is referred to by a device executing an installed application and the device executing the installed application executes the application based on the application information stored in the state management information. That is, in the device executing an installed application, an application not corresponding to the application information stored in the state management information is not executed even when the application is an installed application.

Accordingly, the information processing device according to the embodiment can control installed applications such that the valid states (Activated) and the invalid states (Deactivated) of the applications are controlled, for example, by managing the application information stored in the state management information, as described above, when the functions of the OSs corresponding to the communication schemes other than the communication scheme to which the OS corresponds are realized by the applications.

As described above, for example, even when the function of "FeliCa (registered trademark) OS" (A illustrated in FIG. 1A) is realized on "Java Card (registered trademark) OS," as illustrated in FIG. 1B, the information processing device according to the embodiment can control the valid state (Activated) and the invalid state (Deactivated) of the installed "Type F AP." Accordingly, for example, by managing the application information stored in the state management information, as described above, the same state transition as "ISO/IEC 14443 Type A" or "ISO/IEC 14443

Figure 4:
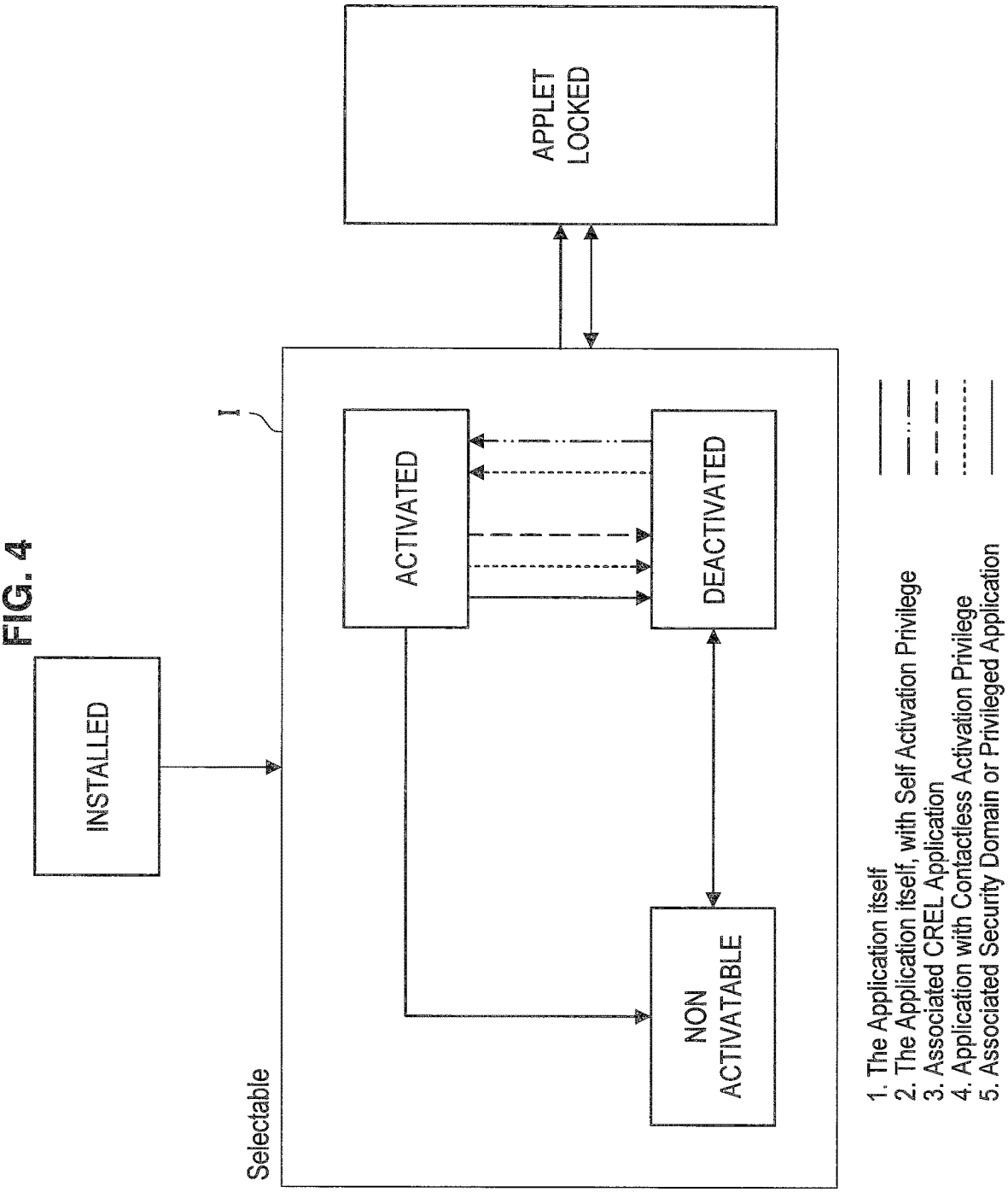
FIG. 4 is an explanatory diagram illustrating an example of application state transition which can be realized when the information processing device according to the embodiment executes the process related to the information processing method according to the embodiment.

Type B" can be realized in the installed "Type F AP" in accordance with the Global Platform (GP) specification, for example, as illustrated in FIG. 4.

FIG. 4 is an explanatory diagram illustrating an example of the application state transition which can be realized when the information processing device according to the embodiment executes the process related to the information processing method according to the embodiment. Here, FIG. 4 illustrates the same state transition as "ISO/IEC 14443 Type A" or "ISO/IEC 14443 Type B" in accordance with the GP specification. Each state of "ACTIVATED," "DEACTIVATED," and "NON ACTIVATABLE" shown in I of FIG. 4 indicates an installed application state. Here, "NON ACTIVATABLE" shown in I of FIG. 4 refers to, for example, a state managed by an application to be executed and a state in which an application does not execute a process based on a process command Accordingly, when the information processing device according to the embodiment executes the process related to the information processing method according to the embodiment, a device executing an installed application can adopt the same operation specification as an operation specification when the application is managed by the same state transition as "ISO/IEC 14443 Type A" or "ISO/IEC 14443 Type B" of the related art in accordance with the GP specification.

The application state transition which can be realized when the information processing device according to the embodiment executes the process related to the information processing method according to the embodiment is not limited to the example illustrated in FIG. 4.

Figure 5:
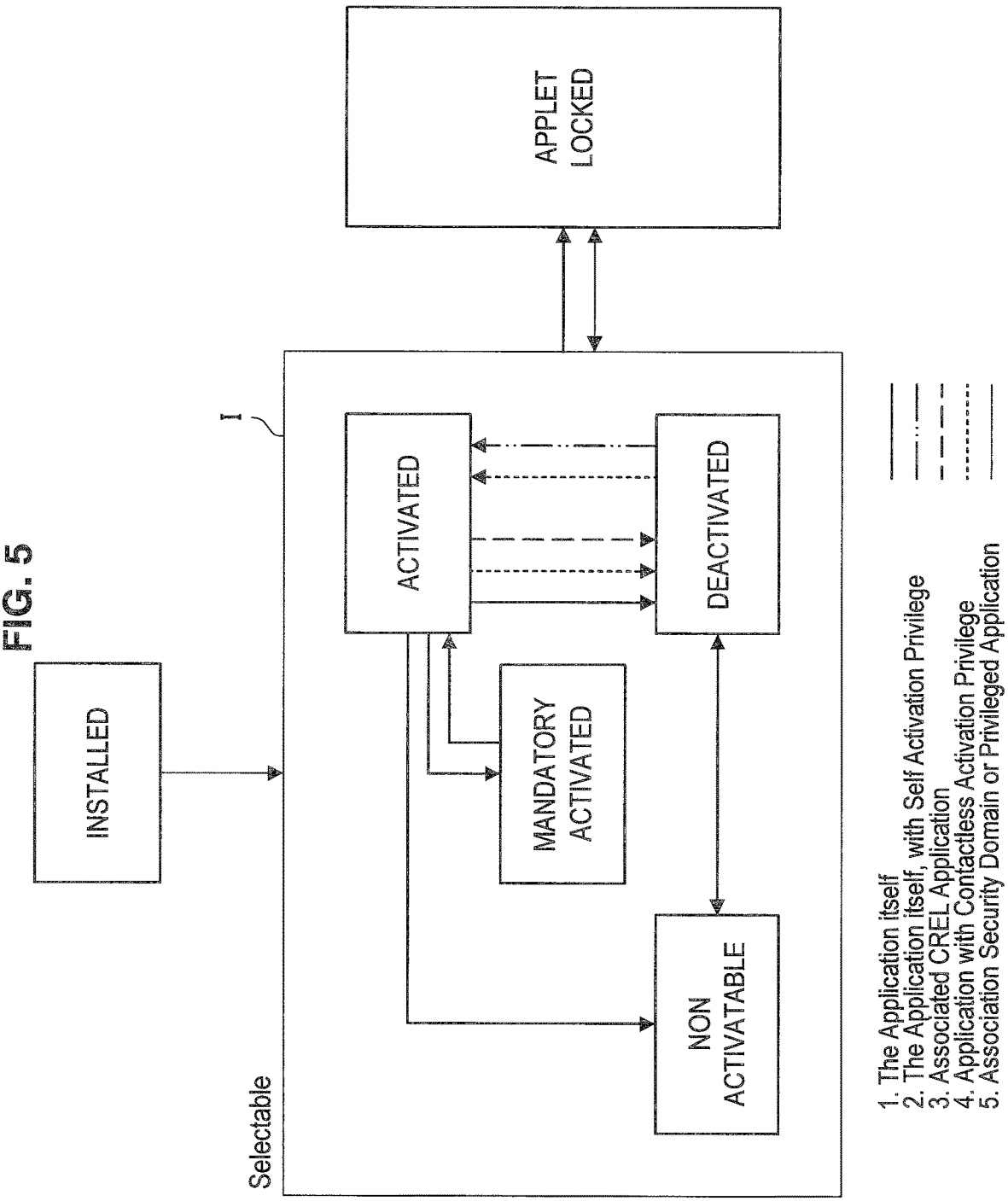
FIG. 5 is an explanatory diagram illustrating another example of application state transition which can be realized when the information processing device according to the embodiment executes the process related to the information processing method according to the embodiment.

FIG. 5 is an explanatory diagram illustrating another example of the application state transition which can be realized when the information processing device according to the embodiment executes the process related to the information processing method according to the embodiment. Here, FIG. 5 illustrates the state transition which is basically the same as the state transition illustrated in FIG. 4, but a state "MANDATORY ACTIVATED" is further provided as an installed application state. "MANDATORY ACTIVATED" illustrated in FIG. 5 refers to, for example, a state managed by an application to be executed and a state in which "ACTIVATED" (valid state) is forced.

For example, when an application is an application managing entrance and exit as a set, as in an application managing entrance and exit of station ticket examination, and the application does not enter the valid state again due to, for example, occurrence of conflict shown in D of FIG. 2, there is a concern that processes at the time of entrance and the time of exit may not be consistent. Accordingly, in the embodiment, for example, the state "MANDATORY ACTIVATED" shown in FIG. 5 is provided. When "MANDATORY ACTIVATED" is set by the application, the information processing device according to the embodiment maintains a state in which the application information corresponding to the application is stored in the state management information. Here, "MANDATORY ACTIVATED" may be managed on, for example, the table (state management information) indicated by A of FIG. 2 or may be managed separately according to flag data or the like. By providing the state "MANDATORY ACTIVATED," it is possible to prevent, for example, the situation in which the processes at the time of entrance and the time of exit described above are not consistent.

A specific example to which the state transition illustrated in FIG. 5 is applied will be described exemplifying an application managing entrance and exit of station ticket examination. For example, when a decrement process is executed on a purse block, the application sets "MANDATORY ACTIVATED." For example, when a cash back process is executed on the purse block at the time of exit of ticket examination, the application executes a process of returning "MANDATORY ACTIVATED" to "ACTIVATED."

The specific example to which the state transition illustrated in FIG. 5 is applied in the application managing entrance and exit of station ticket examination is not limited to the foregoing example.

For example, the application managing entrance and exit of station ticket examination may set "MANDATORY ACTIVATED" based on a command transmitted from an entrance gate of the ticket examination. For example, the CRS application "Java Card Runtime Environment" illustrated in FIG. 1B may set "MANDATORY ACTIVATED" based on a command transmitted from an entrance gate of the ticket examination. When "MANDATORY ACTIVATED" is managed by the CRS application, for example, a processing condition that "the CRS application inquires of an application, confirms that there is no problem, and then sets 'MANDATORY ACTIVATED'" may be set. This is because, when any setting or setting cancellation of "MANDATORY ACTIVATED" is executed by the CRS application, for example, a case in which it may not be possible to prevent the processes at the time of entrance and the time of exit described above from being inconsistent may arise. As a specific example, for example, any setting and setting cancellation of "MANDATORY ACTIVATED" is permitted in the CRS application when authentication is completed by executing ticket examination and authentication while the application executes the ticket examination process (since key information of a given constant level is shared between a device executing the application and a sever managing a ticket examination machine).

[2] Specific Example of Process Related to Information Processing Method According to Embodiment Next, a specific example of the process related to the information processing method according to the embodiment in the information processing device according to the embodiment will be described. Further, a specific example of the process related to the information processing method according to the embodiment will be described below exemplifying, for example, a case in which the function of "FeliCa (registered trademark) OS" (A illustrated in FIG. 1A) is realized on "Java Card (registered trademark) OS," as illustrated in FIG. 1B.

The information processing device according to the embodiment manages, for example, one or two or more applications stored in the storage unit (to be described below) and installed, the application information corresponding to each application, and the state management information in a plurality of layers.

Figure 6:
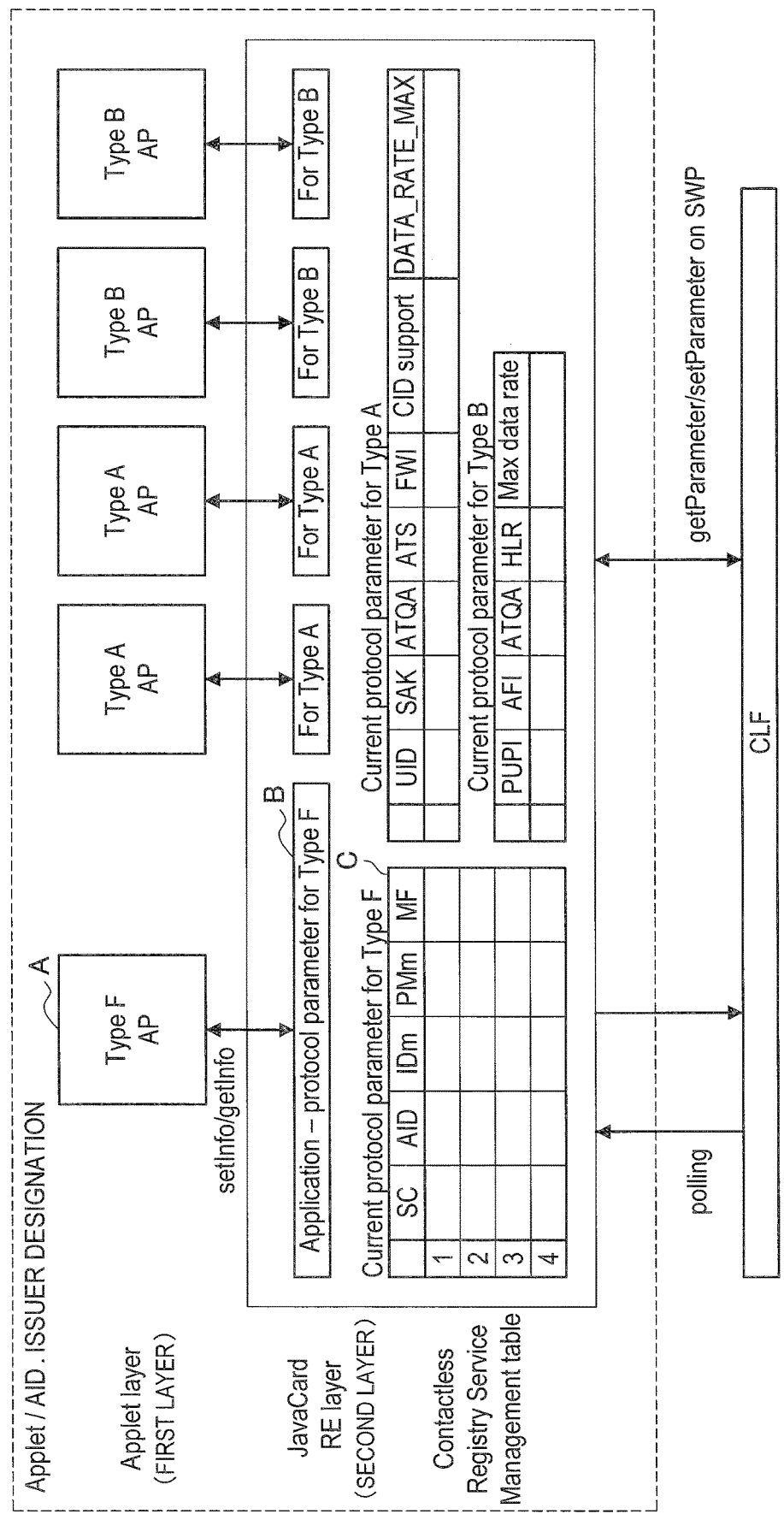
FIG. 6 is an explanatory diagram illustrating an example of layer management of applications, application information corresponding to each of the applications, and state management information in the information processing device according to the embodiment.

FIG. 6 is an explanatory diagram illustrating an example of the layer management of the applications, the application information corresponding to each application, and the state management information in the information processing device according to the embodiment. Here, A illustrated in FIG. 6 indicates an installed application and B illustrated in FIG. 6 indicates application information corresponding to the application indicated by A of FIG. 6. Further, C illustrated in FIG. 6 indicates the state management information. FIG. 6 also illustrates a CLF capable of executing contactless communication with the reader/writer indicated by B of FIG. 1. In FIG. 6, one "Type F AP" is illustrated, but a plurality of "Type F AP" may be stored in the storage unit (to be described below).

FIG. 6 illustrates an example in which the information processing device according to the embodiment stores applications corresponding to "ISO/IEC 14443 Type A" and "ISO/IEC 14443 Type B" of the related art, parameter data corresponding to each application, and "Contactless Registry Service Management table" in, for example, the storage unit (to be described below). Here, in "ISO/IEC 14443 Type A" and "ISO/IEC 14443 Type B," "Contactless Registry Service Management table" is managed by the CLF. That is, the information processing device according to the embodiment does not manage "Contactless Registry Service Management table" corresponding to each of "ISO/IEC 14443 Type A" and "ISO/IEC 14443 Type B" of the related art according to the process related to the information processing method according to the embodiment described above.

As illustrated in FIG. 6, for example, the information processing device according to the embodiment manages the application indicated by A of FIG. 6 in "Applet layer" (an example of a first layer). For example, the information processing device according to the embodiment manages the application information indicated by B of FIG. 6 and the state management information indicated by C of FIG. 6 in "Java Card RE layer" (an example of a second layer), which is lower than "Applet layer" (the example of the first layer). Here, the higher level and the lower level in the layer management according to the embodiment refer to a higher level and a lower level, for example, when viewed from the CLF. For example, the CLF may not directly execute exchange with the application managed in "Applet layer" (the example of the first layer).

Here, the state management information managed by "Java Card RE layer" (the example of the second layer) is stored in a non-volatile recording medium serving as the storage unit (to be described below). However, the recording medium in which the state management information according to the embodiment is stored is not limited to the non-volatile recording medium. For example, when the storage unit (to be described below) includes a volatile recording medium and a non-volatile recording medium, mode information forming the application information included in the state management information may be stored in the volatile recording medium and information (for example, "SC," "AID," "IDm," and "PMm" shown in C of FIG. 6) other than the mode information among the information forming the application information included in the state management information may be stored in the non-volatile recording medium.

Figure 7:
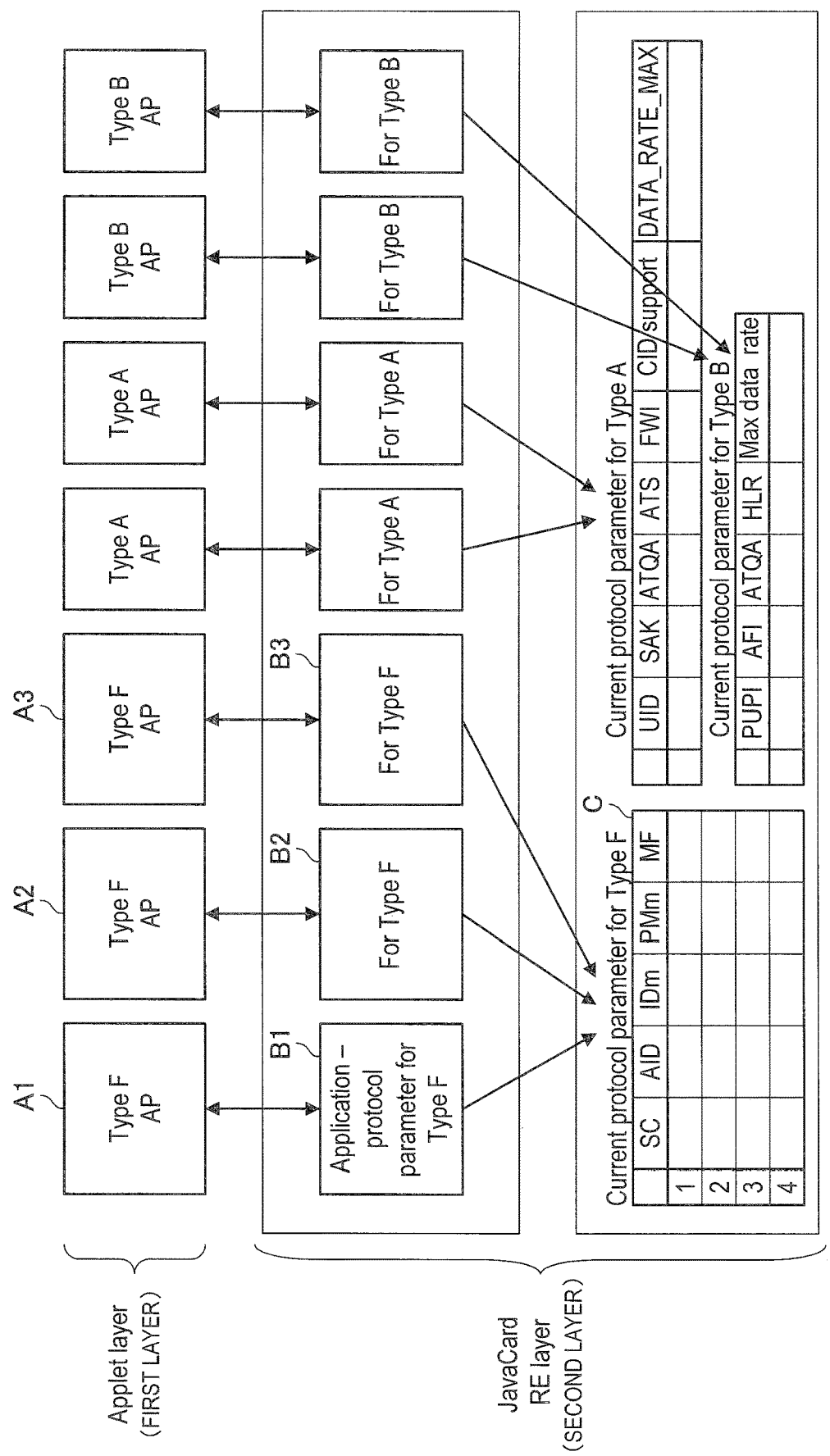
FIG. 7 is an explanatory diagram illustrating an example of a process related to the information processing method in the information processing device according to the embodiment.

FIG. 7 is an explanatory diagram illustrating an example of the process related to the information processing method in the information processing device according to the embodiment. Here, A1 to A3 illustrated in FIG. 7 indicate installed applications and B1 to B3 illustrated in FIG. 7 indicate the application information corresponding to the applications indicated by A1 to A3 of FIG. 7. C illustrated in FIG. 7 indicates the state management information. FIG. 7 illustrates an example in which the information processing device according to the embodiment stores applications corresponding to "ISO/IEC 14443 Type A" and "ISO/IEC 14443 Type B" of the related art, parameter data corresponding to each application, and "Contactless Registry Service Management table" in, for example, the storage unit (to be described below), as in FIG. 6.

As shown in A1 to A3 and B1 to B3 of FIG. 7, for example, the installed applications and the application information corresponding to the applications are stored in the storage unit (to be described below). The information processing device according to the embodiment manages the state management information indicated by C of FIG. 7 by executing the process related to the addition (registration) of the application information to the state management information indicated by C of FIG. 7 and/or the process related to the deletion of the application information from the state management information indicated by C of FIG. 7 using the application information indicated by B1 to B3 of FIG. 7.

Further, "Contactless Registry Service Management table" of each of "ISO/IEC 14443 Type A" and "ISO/IEC 14443 Type B" of the related art is updated using the parameter data corresponding to each application, as illustrated in FIG. 7.

Figure 8:
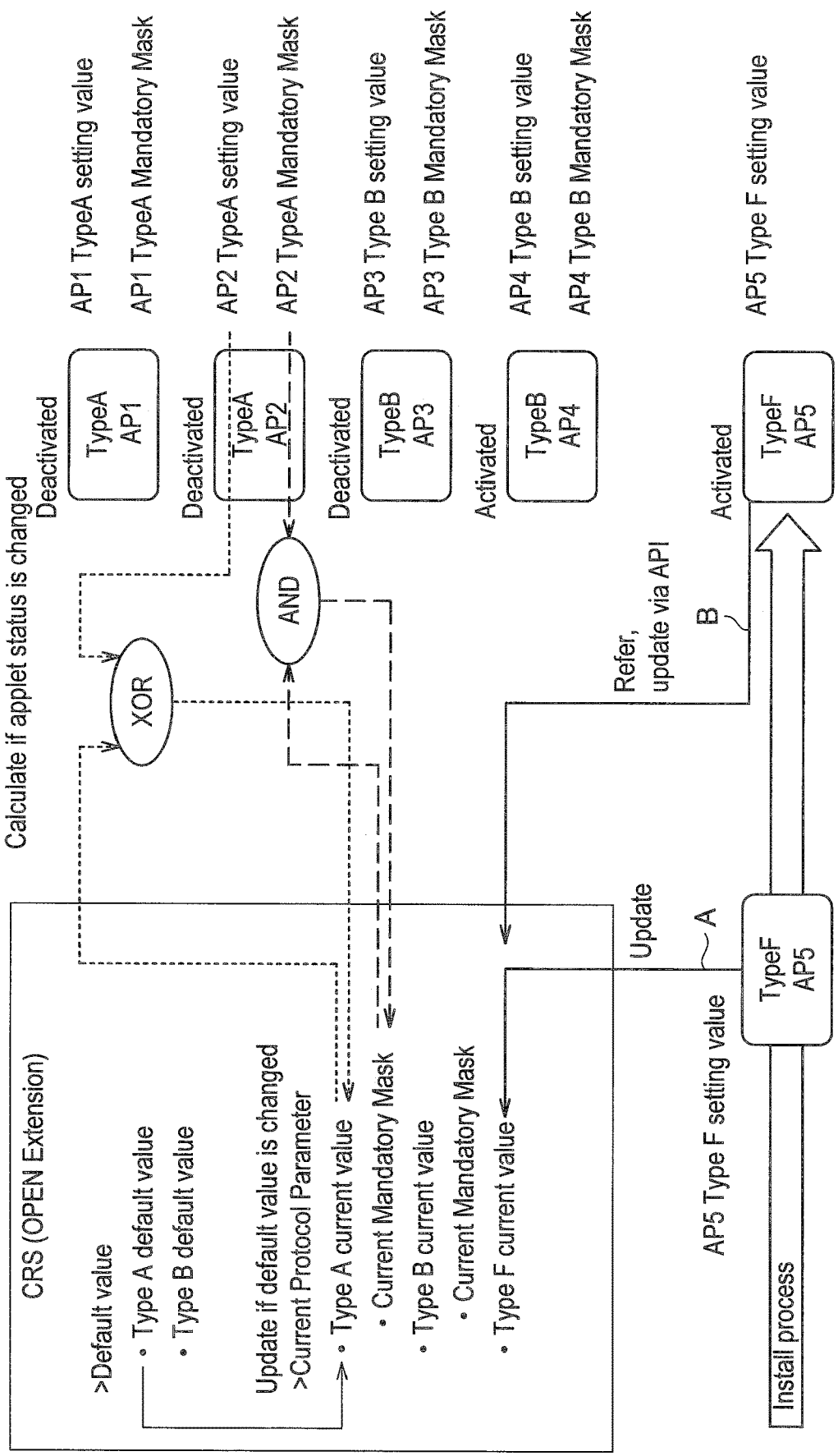
FIG. 8 is an explanatory diagram illustrating an example of a process related to update of the state management information in the information processing device according to the embodiment.

FIG. 8 is an explanatory diagram illustrating an example of a process related to the update of the state management information in the information processing device according to the embodiment. Here, FIG. 8 shows a case in which "Type F AP5" is installed and a case in which "Type F AP5" is changed from the invalid state (Deactivated) to the valid state (Activated). In FIG. 8, an example of the process related to the update of "Contactless Registry Service Management table" in "ISO/IEC 14443 Type A" of the related art is illustrated exemplifying "Type A AP2."

As indicated by A of FIG. 8, the information processing device according to the embodiment updates the state management information based on an installation command (an example of the process command) when "Type F AP5" is installed. More specifically, for example, the information processing device according to the embodiment updates the state management information, for example, by executing the process related to the addition (registration) of the application information to the state management information according to the embodiment, as illustrated with reference to FIG. 2.

As indicated by B of FIG. 8, the information processing device according to the embodiment updates the state management information based on a process command to set "Type F AP5" to the valid state when "Type F AP5" is changed from the invalid state (Deactivated) to the valid state (Activated), i.e., when "Type F AP5" is newly set in the valid state. More specifically, the information processing device according to the embodiment updates the state management information, for example, by executing the process related to the addition (registration) of the application information to the state management information according to the embodiment, as illustrated with reference to FIG. 2, via an Application Program Interface (API).

The information processing device according to the embodiment manages the state management information, for example, by executing the process illustrated in FIG. 8 to update the state management information. It is needless to say that the example of the process related to the update of the state management information in the information processing device according to the embodiment is not limited to the example illustrated in FIG. 8.

As illustrated in FIG. 6, the information processing device according to the embodiment manages, for example, one or two or more applications stored in the storage unit (to be described below) and installed, the application information corresponding to each application, and the state management information in a plurality of layers.

The layer management in the information processing device according to the embodiment is not limited to the management in two layers, as illustrated in FIG. 6.

Figure 9:
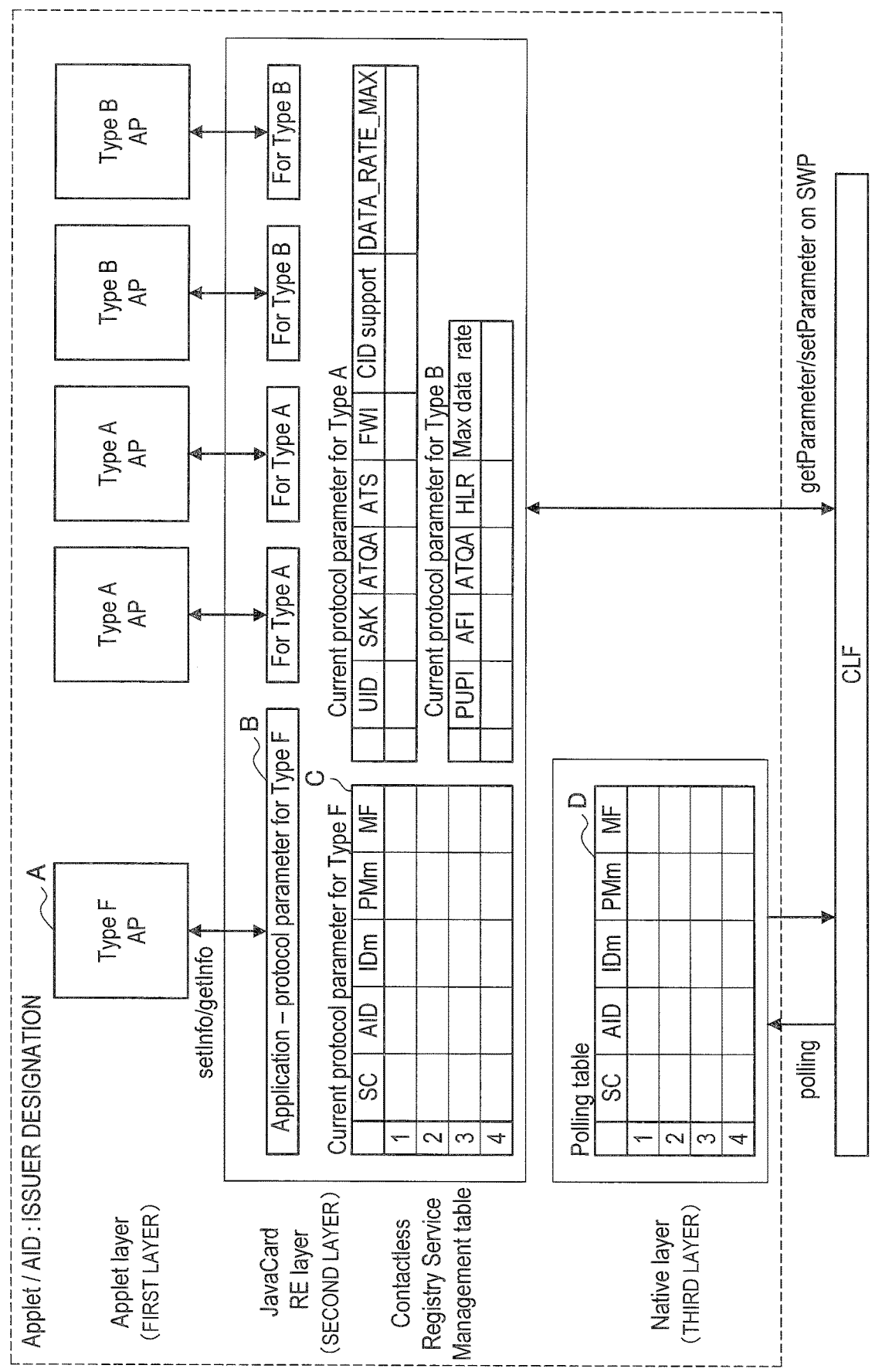
FIG. 9 is an explanatory diagram illustrating another example of layer management of applications, application information corresponding to each of the applications, and state management information in the information processing device according to the embodiment.

FIG. 9 is an explanatory diagram illustrating another example of the layer management of the applications, the application information corresponding to each application, and the state management information in the information processing device according to the embodiment. Here, A illustrated in FIG. 9 indicates an installed application and B illustrated in FIG. 9 indicates application information corresponding to the application indicated by A of FIG. 9. Further, C illustrated in FIG. 9 indicates the state management information. As in FIG. 6, FIG. 9 also illustrates a CLF. As in FIG. 6, FIG. 9 illustrates an example in which the information processing device according to the embodiment stores applications corresponding to "ISO/IEC 14443 Type A" and "ISO/IEC 14443 Type B" of the related art, parameter data corresponding to each application, and "Contactless Registry Service Management table" in, for example, the storage unit (to be described below).

As illustrated in FIG. 9, as in the example illustrated in FIG. 6, for example, the information processing device according to the embodiment manages the application indicated by A of FIG. 9 in "Applet layer" (an example of a first layer) and manages the application information indicated by B of FIG. 9 and the state management information indicated by C of FIG. 9 in "Java Card RE layer" (an example of a second layer), which is lower than "Applet layer" (the example of the first layer). The information processing device according to the embodiment further provides, for example, "Native layer" (an example of a third layer), which is lower than "Java Card RE layer" (the example of the second layer). As indicated by D of FIG. 9, the information processing device according to the embodiment manages, in "Native layer" (the example of the third layer), state management information copied from the state management information managed in "Java Card RE layer" (the example of the second layer).

When the layer management is executed with the layer structure illustrated in FIG. 9 and a polling signal is acquired, the information processing device according to the embodiment executes a process according to the polling signal using the state management information indicated by D of FIG. 9 and managed in "Native layer" (the example of the third layer). Here, as described above, for example, the information processing device according to the embodiment executes the process according to the polling signal based on the mode information forming the application information corresponding to the polling signal and included in the state management information.

As described above, for example, when the information processing device according to the embodiment executes the process according to the polling signal using the state management information indicated by D of FIG. 9, the information processing device according to the embodiment can further improve a processing speed of the process according to the polling signal than when the layer management is executed with the layer structure illustrated in FIG. 6.

When the layer management is executed with the layer structure illustrated in FIG. 9, the information processing device according to the embodiment manages each of the state management information managed in "Java Card RE layer" (the example of the second layer) and the state management information managed in "Native layer" (the example of the third layer), for example, by updating the state management information indicated by C of FIG. 9 and copying the updated state management information.

When the layer management is executed with the layer structure illustrated in FIG. 9, the process related to the management of the state management information is not limited to the foregoing process. When the layer management is executed with the layer structure illustrated in FIG. 9, as described above, the information processing device according to the embodiment executes, for example, the process according to the polling signal using the state management information managed in "Native layer" (the example of the third layer) indicated by D of FIG. 9. Accordingly, when the mode information forming the application information is included in the application information included in the state management information, for example, as indicated by C and D of FIG. 9, and the mode information is updated, for example, the information processing device according to the embodiment can also update the mode information included in the state management information managed in "Native layer" (the example of the third layer) and may not update the mode information included in the state management information managed in "Java Card RE layer" (the example of the second layer).

For example, even when only the mode information included in the state management information managed in "Native layer" (the example of the third layer) is updated, as described above, the information processing device according to the embodiment can execute the process according to the polling signal normally. For example, since the process related to the management of the state management information can be further simplified, for example, by updating only the mode information included in the state management information managed in "Native layer" (the example of the third layer), as described above, it is possible to speed up the process related to the management of the state management information.

Here, the state management information managed by "Java Card RE layer" (the example of the second layer) and the state management information managed by "Native layer" (the example of the third layer) are stored in a non-volatile recording medium serving as the storage unit (to be described below). However, the recording medium in which the state management information according to the embodiment is recorded is not limited to the above-mentioned medium. For example, when the storage unit (to be described below) includes a volatile recording medium and a non-volatile recording medium, mode information forming the application information included in the state management information may be stored in the volatile recording medium and information (for example, "SC," "AID," "IDm," and "PMm" shown in C of FIG. 6) other than the mode information among the information forming the application information included in the state management information may be stored in the non-volatile recording medium.

(Information Processing Device According to Embodiment)

Next, an example of the configuration of the information processing device according to the embodiment capable of executing the process related to the information processing method according to the embodiment described above will be described.

Figure 10:
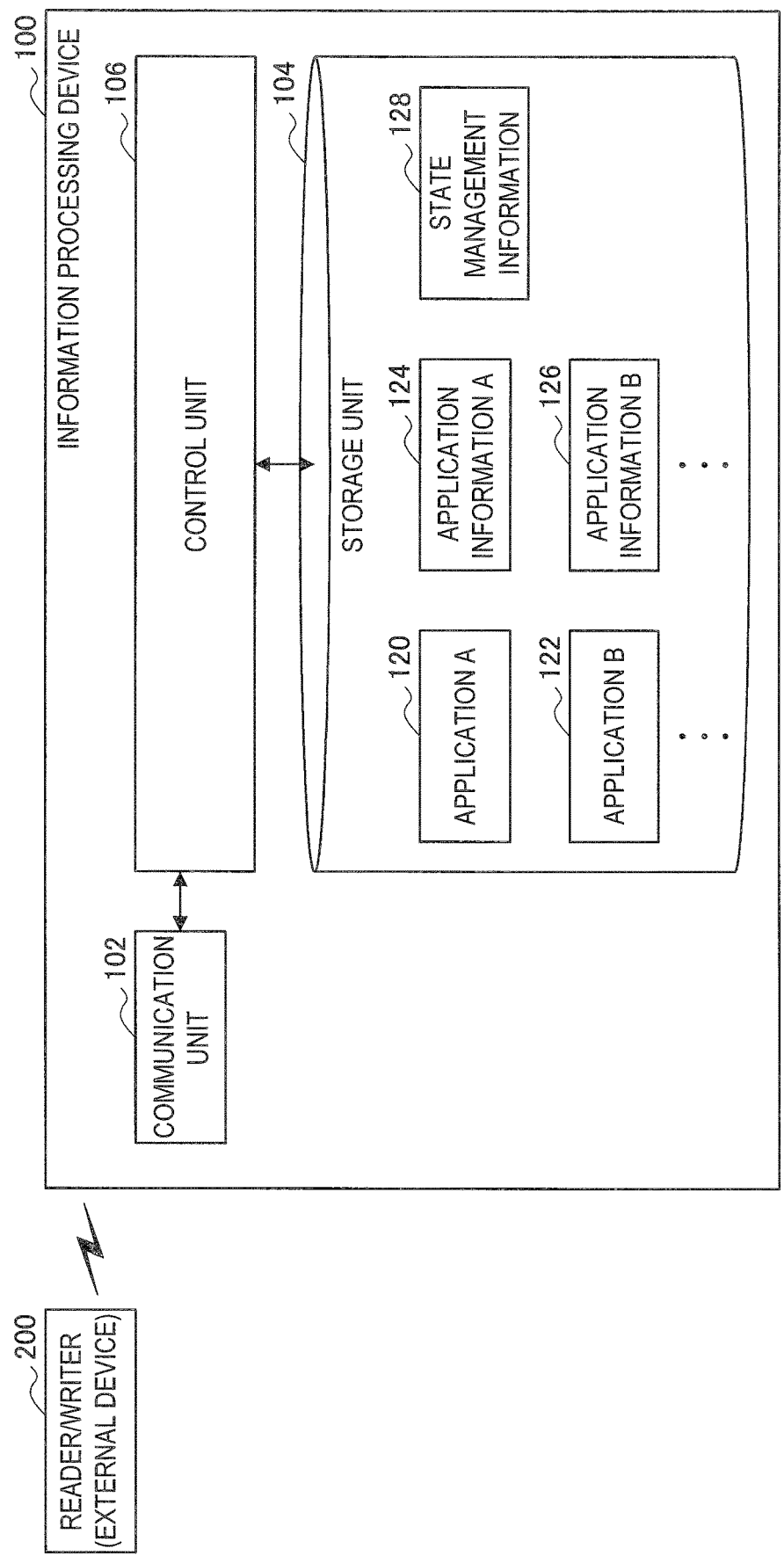
FIG. 10 is a block diagram illustrating an example of the configuration of the information processing device according to the embodiment.

[1] Example of Configuration of Information Processing Device According to Embodiment FIG. 10 is a block diagram illustrating an example of the configuration of an information processing device 100 according to the embodiment. In FIG. 10, a reader/writer 200 (an example of an external device) executing contactless communication with the information processing device 100 is also illustrated.

The information processing device 100 includes, for example, a communication unit 102, a storage unit 104, and a control unit 106.

The information processing device 100 may include, for example, a read-only memory (ROM) (not illustrated), a random access memory (RAM) (not illustrated), an operation unit (not illustrated) which can be operated by a user, and a display unit (not illustrated) which displays various screens on a display screen. In the information processing device 100, for example, the foregoing constituent elements are connected via a bus serving as a data transmission path.

Here, the ROM (not illustrated) stores a program and control data such as arithmetic parameters used by the control unit 106. The RAM (not illustrated) temporarily stores a program or the like executed by the control unit 106.

Examples of the operation unit (not illustrated) include a button, a direction key, a rotation type selector such as a jog dial, and a combination thereof. The information processing device 100 can also be connected to, for example, an operation input device (for example, a keyboard or a mouse) serving as an external device of the information processing device 100.

When the operation unit (not illustrated) is provided and an operation signal indicating a process command which is based on a user's operation is transmitted from the operation unit (not illustrated), the information processing device 100 manages the application information stored in the state management information based on the process command which is based on the user's operation indicated by the operation signal. When an operation signal indicating a process command which is based on a user's operation is transmitted from an operation input device serving as an external device, the information processing device 100 manages the application information stored in the state management information based on the process command which is based on the user's operation indicated by the operation signal.

Examples of the display unit (not illustrated) include a liquid crystal display (LCD), an organic electroluminescence (EL) display (also called an organic light emitting diode (OLED) display). The display unit (not illustrated) may be, for example, a device such as a touch screen on which display and a user's operation are possible. The information processing device 100 can also be connected to a display device (for example, an external display) serving as an external device of the information processing device 100 irrespective of whether the display unit (not illustrated) is present or not.

The communication unit 102 is a communication unit included in the information processing device 100 and executes contactless communication with an external device such as the reader/writer 200, for example, through carrier waves with a predetermined frequency such as 13.56 [MHz]. Here, for example, the CLF shown in FIG. 1B can be exemplified as the communication unit 102.

[Example of Hardware Configuration of Communication Unit 102]

Figure 11:
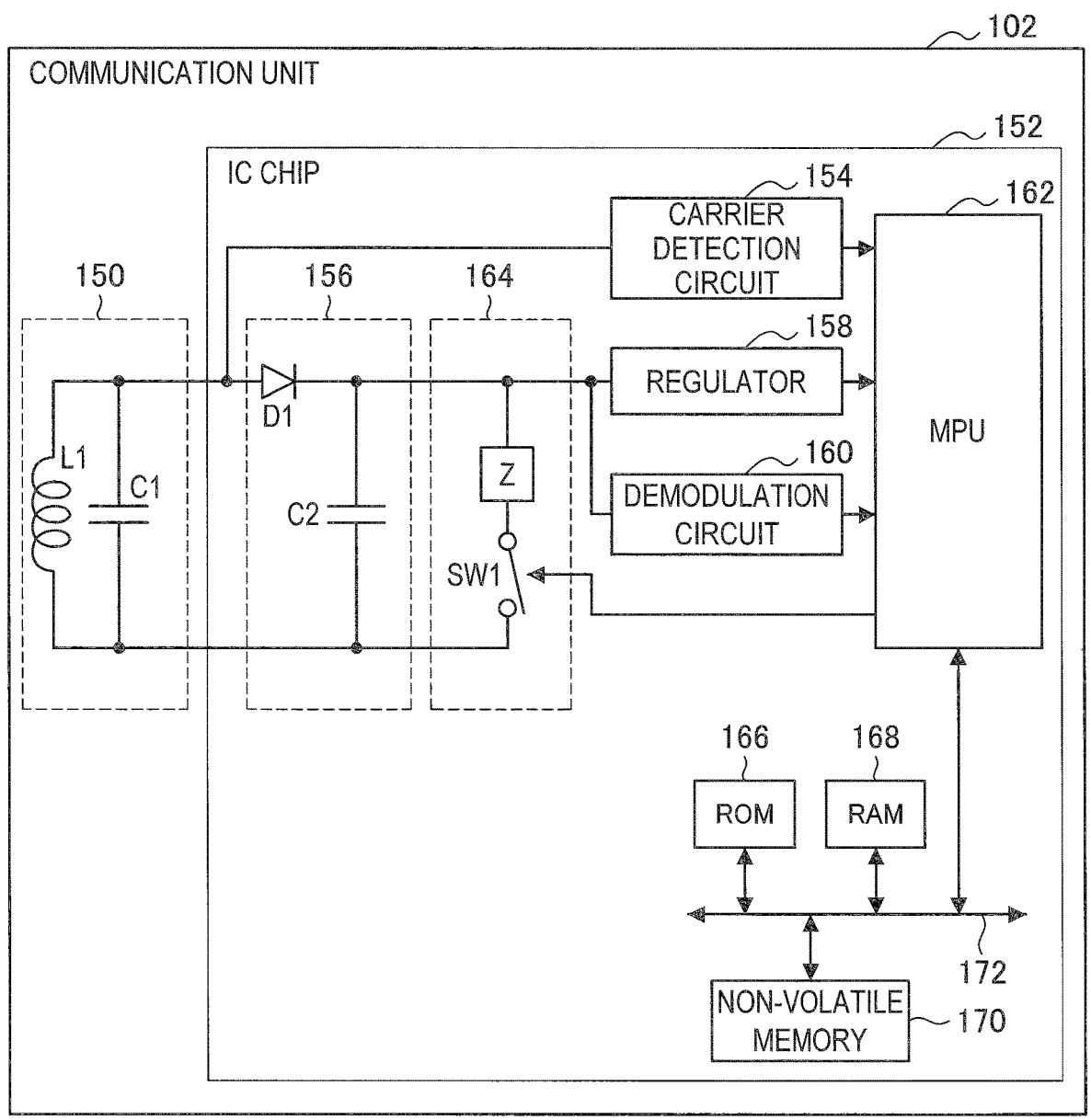
FIG. 11 is an explanatory diagram illustrating an example of the configuration of a communication unit included in the information processing device according to the embodiment.

FIG. 11 is an explanatory diagram illustrating an example of the configuration of the communication unit 102 included in the information processing device 100 according to the embodiment.

The communication unit 102 includes a communication antenna 150 which can receive carrier waves and an IC chip that demodulates carrier-wave signals based on the received carrier waves and transmits a response signal through load modulation. In the communication unit 102 according to the embodiment, for example, the configuration of the IC chip 152 may not be included in the form of an IC chip.

The communication antenna 150 is configured with a resonant circuit including a coil (inductor) L1 having pre-determined inductance and a capacitor C1 having predetermined electrostatic capacitance and produces an induced voltage through electromagnetic induction in response to reception of the carrier waves. Then, the communication antenna 150 outputs a reception voltage obtained by resonating the induced voltage with a predetermined resonant frequency. Here, for example, the resonant frequency in the communication antenna 150 is set according to the frequency of the carrier waves such as 13.56 [MHz]. The communication antenna 150 with the foregoing configuration receives the carrier waves and transmits a response signal through load modulation executed in a load modulation circuit 164 included in the IC chip 152.

The IC chip 152 includes a carrier detection circuit 154, a wave detection circuit 156, a regulator 158, a demodulation circuit 160, an MPU 162, and the load modulation circuit 164. Although not illustrated in FIG. 11, the IC chip 152 may further include, for example, a protective circuit (not illustrated) to prevent an overvoltage or an overcurrent from being applied to the MPU 160. Here, as the protective circuit (not illustrated), for example, a clamp circuit including a diode can be exemplified.

The IC chip 152 includes, for example, a ROM 166, a RAM 168, and a non-volatile memory 170. The MPU 162, the ROM 166, the RAM 168, and the non-volatile memory 170 are connected by, for example, a bus 172 serving as a data transmission path.

The ROM 166 stores a program and control data such as arithmetic parameters used by the MPU 162. The RAM 168 temporarily stores a program, an arithmetic result, an execution state, or the like executed by the MPU 162.

The non-volatile memory 170 stores, for example, various kinds of data such as an electronic value (money or data having a monetary value) or an application. Here, as the recording medium 156, for example, an electrically erasable and programmable read only memory (EEPROM) or a flash memory can be exemplified.

The carrier detection circuit 154 generates, for example, a rectangular detection signal based on the reception voltage transmitted from the communication antenna 150 and transmits the detection signal to the MPU 162. For example, the MPU 162 uses the transmitted detection signal as a process clock for data processing. Here, since the detection signal is based on the reception voltage transmitted from the communication antenna 150, the detection signal is synchronized with the frequency of the carrier waves transmitted from the reader/writer 200. Accordingly, since the IC chip 152 includes the carrier detection circuit 154, the IC chip 152 can execute a process with the reader/writer 200 in synchronization with the reader/writer 200.

The wave detection circuit 156 rectifies the reception voltage output from the communication antenna 150. Here, the wave detection circuit 156 includes, for example, a diode D1 and a capacitor C2.

The regulator 158 smoothes and stabilizes the reception voltage and outputs a driving voltage to the MPU 162. Here, the regulator 158 uses a direct-current component of the reception voltage as the driving voltage.

The demodulation circuit 160 demodulates the carrier-wave signal based on the reception voltage and outputs data (for example, a data signal binarized with a high level and a low level) corresponding to the carrier-wave signal included in the carrier wave. Here, the demodulation circuit 160 outputs an alternating-current component of the reception voltage as data.

The MPU 162 drives the driving voltage output from the regulator 158 as power and processes the data demodulated by the demodulation circuit 160. Here, the MPU 162 includes, for example, a micro-processing unit (MPU) and various processing circuits.

The MPU 162 selectively generates a control signal controlling the load modulation related to a response to the reader/writer 200 according to a process result. Then, the MPU 162 selectively outputs the control signal to the load modulation circuit 164.

The load modulation circuit 164 includes, for example, a load Z and a switch SW1 and executes load modulation by selectively connecting (validating) the load Z according to the control signal transmitted from the MPU 162. Here, the load Z includes, for example, a resistor with a predetermined resistant value. The switch SW1 includes, for example, a p-channel metal oxide semiconductor field effect transistor (MOSFET) or an n-channel MOSFET.

The IC chip 152 with the foregoing configuration can process the carrier-wave signal received by the communication antenna 150 and transmit a response signal to the communication antenna 150 through the load modulation.

The communication unit 102 has, for example, the configuration illustrated in FIG. 11 and executes the contactless communication with the reader/writer 200 using the carrier waves. It is needless to say that the configuration of the communication unit 102 according to the embodiment is not limited to the example illustrated in FIG. 11.

Referring back to FIG. 10, an example of the configuration of the information processing device 100 will be described.

The storage unit 104 is a storage mechanism included in the information processing device 100 and stores, for example, various kinds of data such as installed applications, the application information corresponding to the applications, and state management information. FIG. 10 illustrates an example in which an installed application A120, an installed application B122, etc., application information A124 corresponding to the application A120, application information B126 corresponding to the application B122, etc., and state management information 128 are stored in the storage unit 104. The data stored in the storage unit 104 is not limited to the example illustrated in FIG. 10. For example, when applications are not installed, the storage unit 104 may not store the applications (for example, the installed application A120, the installed application B122, etc.) and the application information (for example, the application information A124, the application information B126 corresponding to the application B122, etc.) corresponding to the applications.

Here, as the storage unit 104, for example, a non-volatile recording medium such as a magnetic recording medium such as a hard disk or a non-volatile memory such as an erasable programmable read only memory (EPROM), an electrically erasable and programmable read only memory (EEPROM), or a flash memory can be exemplified. The storage unit 104 may be detachably mounted on the information processing device 100.

The storage unit 104 is not limited to the non-volatile recording medium. For example, the storage unit 104 may include a non-volatile recording medium and a volatile recording medium. As the volatile recording medium, for example, a volatile memory such as a synchronous dynamic random access memory (SDRAM) or a static random access memory (SRAM) can be exemplified. When the storage unit 104 includes a non-volatile recording medium and a volatile recording medium, for example, the mode information forming the application information included in the state management information 128 is stored in the volatile recording medium and information other than the mode information among the information forming the application information included in the state management information 128 is stored in the non-volatile recording medium.

The control unit 106 includes, for example, an MPU and various processing circuits and serves to control the entire information processing device 100. For example, the control unit 106 serves to initiatively execute the process related to the information processing method according to the embodiment and controls the valid state and the invalid state of an application by managing the application information stored in the state management information 128 based on the process command. For example, the control unit 106 may execute the CRS application of "Java Card Runtime Environment" and execute the process related to the information processing method according to the embodiment using the executed CRS application.

The information processing device 100 with, for example, the configuration illustrated in FIG. 10 executes the process related to the information processing method according to the embodiment. Accordingly, the information processing device 100 with, for example, the configuration illustrated in FIG. 10 can control the installed applications such that the valid states and the invalid states of the installed applications are controlled when the functions of the OSs corresponding to the communication schemes other than the communication scheme to which the OS corresponds are realized as applications.

The configuration of the information processing device according to the embodiment is not limited to the configuration illustrated in FIG. 10.

For example, the information processing device according to the embodiment may further include a second communication unit (not illustrated) that executes wireless/wired communication with an external device such as a server via a network (or directly). When the information processing device further includes the second communication unit (not illustrated), the information processing device according to the embodiment can manage the application information stored in the state management information based on the process command indicated by the signal indicating the process command transmitted from an external device such as a server and received by the second communication unit (not illustrated).

Here, as the second communication unit (not illustrated), for example, a communication antenna and a radio frequency (RF) circuit (wireless communication), an IEEE 802.15.1 port and a transceiver circuit (wireless communication), an IEEE 802.11b port and a transceiver circuit (wireless communication), or a local area network (LAN) terminal and a transceiver circuit (wired communication) can be exemplified. As the network according to the embodiment, for example, a wired network such as a network executing communication via a LAN, a wide area network (WAN), or a power line by a PLC, a wireless network such as a wireless LAN (WLAN: Wireless Local Area Network) or a wireless WAN (WWAN: Wireless Wide Area Network) via a base station, or the Internet using a communication protocol such as Transmission Control Protocol/Internet Protocol (TCP/IP) can be exemplified.

For example, the information processing device according to the embodiment may include an operation unit (not illustrated), as described above. When the information processing device includes the operation unit (not illustrated) and an operation signal indicating a process command based on a user's operation is transmitted from the operation unit (not illustrated), the information processing device according to the embodiment manages the application information stored in the state management information based on the process command based on the user's operation and indicated by the operation signal transmitted from the operation unit (not illustrated).

For example, the information processing device according to the embodiment may not include the communication unit 102. Even when the information processing device is configured not to include the communication unit 102, the information processing device according to the embodiment can manage the application information stored in the state management information based on the process command indicated by the signal indicating the process command transmitted from the external device such as the reader/writer 200 by acquiring a signal indicating a process command received from an external device such as the reader/writer 200 by a separate device or circuit serving as the communication unit 102 such as the CLF from the separate device or circuit.

For example, the information processing device according to the embodiment may not include the storage unit 104. Even when the information processing device is configured not to include the storage unit 104, the information processing device according to the embodiment can execute the process related to the information processing method according to the embodiment, for example, by using various kinds of data (the state management information and the like) stored in an external recording medium from or on which the information processing device according to the embodiment can read data or write data.

The information processing device according to the embodiment may include an audio output unit (not illustrated) which can output an audio. As the audio output unit (not illustrated), for example, a digital signal processor (DSP) and an audio output device can be exemplified. As the audio output device according to the embodiment, for example, an amplifier and a speaker can be exemplified.

[II] Examples of Process in Information Processing Device 100

Next, examples of the process in the information processing device 100 will be described.

(i) First Example of Process in Information Processing Device 100

Figure 12:
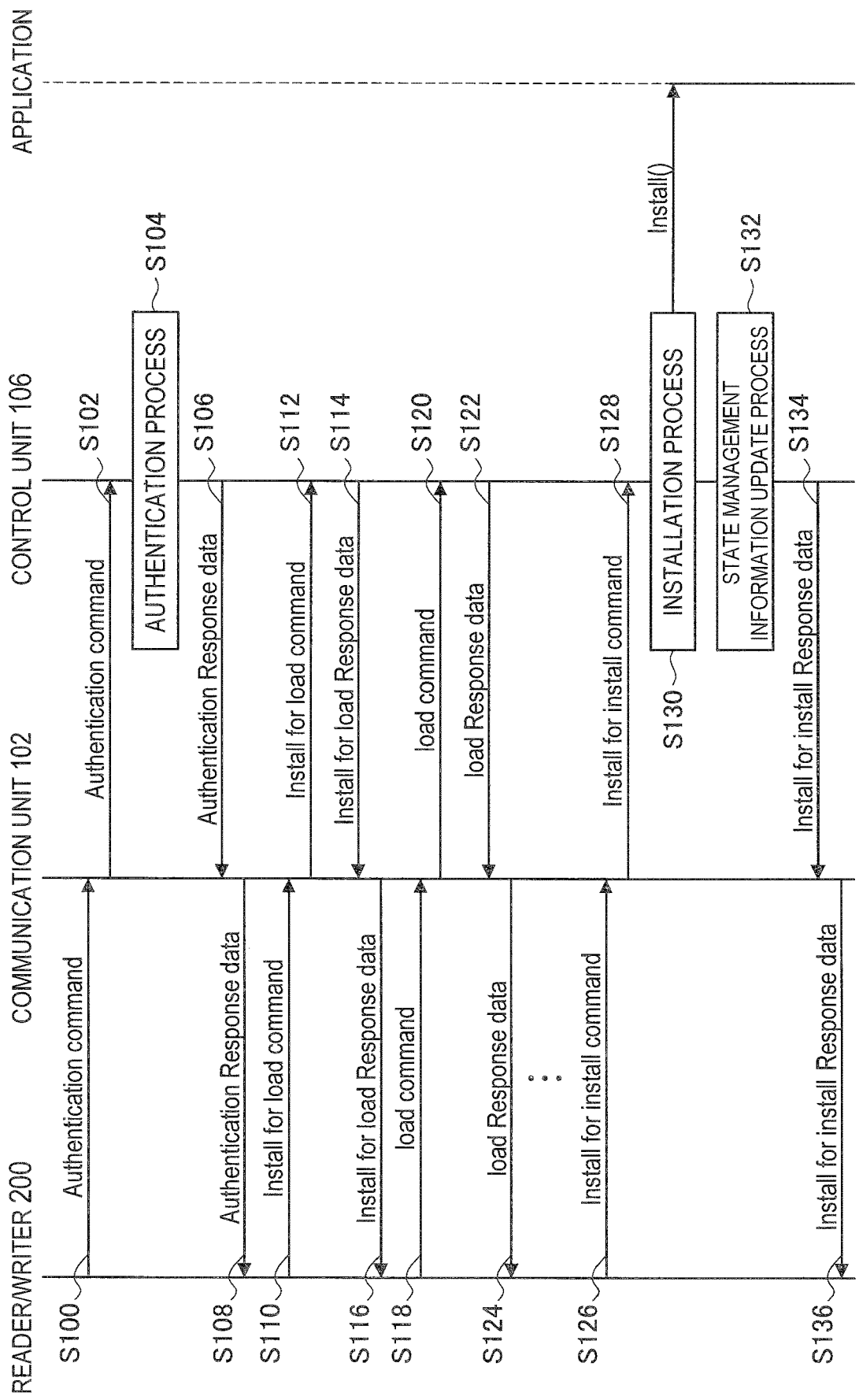
FIG. 12 is an explanatory diagram illustrating a first example of a process in the information processing device according to the embodiment.

FIG. 12 is an explanatory diagram illustrating a first example of the process in the information processing device 100 according to the embodiment. FIG. 12 illustrates an example of a process when the information processing device 100 executes contactless communication with the reader/writer 200 illustrated in FIG. 10. FIG. 12 illustrates an example of a process when applications are installed.

The reader/writer 200 transmits "Authentication command" for authentication (S100).

The communication unit 102 having received "Authentication command" transmitted from the reader/writer 200 in step S100 transmits the received "Authentication command" to the control unit 106 (S102). Here, for example, the communication unit 102 and the control unit 106 execute serial communication according to a Single Wire Protocol (SWP). The communication between the communication unit 102 and the control unit 106 according to the embodiment is not limited to the foregoing communication, but communication can be executed according to any communication scheme.

The control unit 106 having received "Authentication command" transmitted from the communication unit 102 in step S102 executes authentication based on "Authentication command" (authentication process in S104). Then, the control unit 106 transmits "Authentication Response data" indicating an authentication result to the communication unit 102 (S106).

The communication unit 102 having received "Authentication Response data" transmitted from the control unit 106 in step S106 transmits the received "Authentication Response data" through, for example, load modulation (S108).

The reader/writer 200 having received "Authentication Response data" transmitted from the communication unit 102 in step S108 determines whether the authentication in the information processing device 100 is completed normally based on "Authentication Response data." Here, in FIG. 12, the authentication in the information processing device 100 (the control unit 106) is assumed to be completed normally. Then, when the reader/writer 200 determines that the authentication is completed normally, the reader/writer 200 sequentially transmits, for example, "Install for load command," "load command," and "Install for install command" as a process related to the installation of the application. Further, it is needless to say that the process commands transmitted in the process related to the installation of the application by the reader/writer 200 are not limited to the foregoing examples.

The reader/writer 200 transmits "Install for load command" (S110).

The communication unit 102 having received "Install for load command" transmitted from the reader/writer 200 in step S110 transmits the received "Install for load command" to the control unit 106 (S112).

The control unit 106 having received "Install for load command" transmitted from the communication unit 102 in step S112 executes a process based on "Install for load command" and transmits "Install for load Response data" indicating a process result to the communication unit 102 (S114).

The communication unit 102 having received "Install for load Response data" transmitted from the control unit 106 in step S114 transmits the received "Install for load Response data" through, for example, the load modulation (S116).

The reader/writer 200 having received "Install for load Response data" transmitted from the communication unit 102 in step S116 determines whether the process based on "Install for load command" in the information processing device 100 is completed normally. Here, in FIG. 12, the process based on "Install for load command" in the information processing device 100 (the control unit 106) is assumed to be completed normally. When the reader/writer 200 determines that the process based on "Install for load command" is assumed to be completed normally, the reader/writer 200 executes, for example, the process of step S110 again.

The reader/writer 200 transmits "load command" (S118).

The communication unit 102 having received "load command" transmitted from the reader/writer 200 in step S118 transmits the received "load command" to the control unit 106 (S120).

The control unit 106 having received "load command" transmitted from the communication unit 102 in step S120 executes a process based on "load command" and transmits "load Response data" indicating a process result to the communication unit 102 (S122).

The communication unit 102 having received "load Response data" transmitted from the control unit 106 in step S122 transmits the received "load Response data" through, for example, the load modulation (S124).

The reader/writer 200 having received "load Response data" transmitted from the communication unit 102 in step S124 determines whether the process based on "load command" in the information processing device 100 is completed normally. Here, in FIG. 12, the process based on "load command" in the information processing device 100 (the control unit 106) is assumed to be completed normally. The processes of step S118 to step S124 are repeated until the transmission of all of "load command" in the reader/writer 200 between the reader/writer 200 and the information process device 100 is completed. When the reader/writer 200 determines that the process based on "load command" is not completed normally, for example, the reader/writer 200 retransmits "load command" corresponding to "load Response data" indicating that it is determined that the process is not completed normally.

The reader/writer 200 transmits "Install for install command" (S126).

The communication unit 102 having received "Install for install command" transmitted from the reader/writer 200 in step S126 transmits the received "Install for install command" to the control unit 106 (S128).

The control unit 106 having received "Install for install command" transmitted from the communication unit 102 in step S128 executes an application installation process based on "Install for install command" (S130). In the process of step S130, the applications and the application information corresponding to the applications are stored in, for example, the storage unit 104.

Based on "Install for install command," the control unit 106 updates the state management information stored in, for example, the storage unit 104 (state management information update process in S132). FIG. 13 is an explanatory diagram illustrating an example of a process related to the update of the state management information in the information processing device 100 according to the embodiment. A illustrated in FIG. 13 indicates an example of the application information included in, for example, "Install for install command" B illustrated in FIG. 13 indicates an example of the state management information updated based on the application information.

When the processes of step S130 and S132 are executed, the control unit 106 transmits "Install for install Response data" indicating a process result to the communication unit 102 (S134).

The communication unit 102 having received "Install for install Response data" transmitted from the control unit 106 in step S134 transmits the received "Install for install Response data" through, for example, the load modulation (S136).

The reader/writer 200 having received "Install for install Response data" transmitted from the communication unit 102 in step S136 determines whether the process based on "Install for install command" in the information processing device 100 is completed normally. Here, in FIG. 12, the process based on "Install for install command" in the information processing device 100 (the control unit 106) is assumed to be completed normally. When the reader/writer 200 determines that the process based on "Install for install command" is assumed to be completed normally, the reader/writer 200 executes, for example, the process of step S126 again.

When applications are installed, the information processing device 100 executes, for example, the process illustrated in FIG. 12.

The process of the information processing device 100 when the applications are installed is not limited to the process illustrated in FIG. 12. For example, as described with reference to FIG. 9, the information processing device according to the embodiment can also manage the state management information copied from the state management information managed in "Java Card RE layer" (the example of the second layer), in "Native layer" (the example of the third layer), which is lower than "Java Card RE layer" (the example of the second layer).

Figure 14:
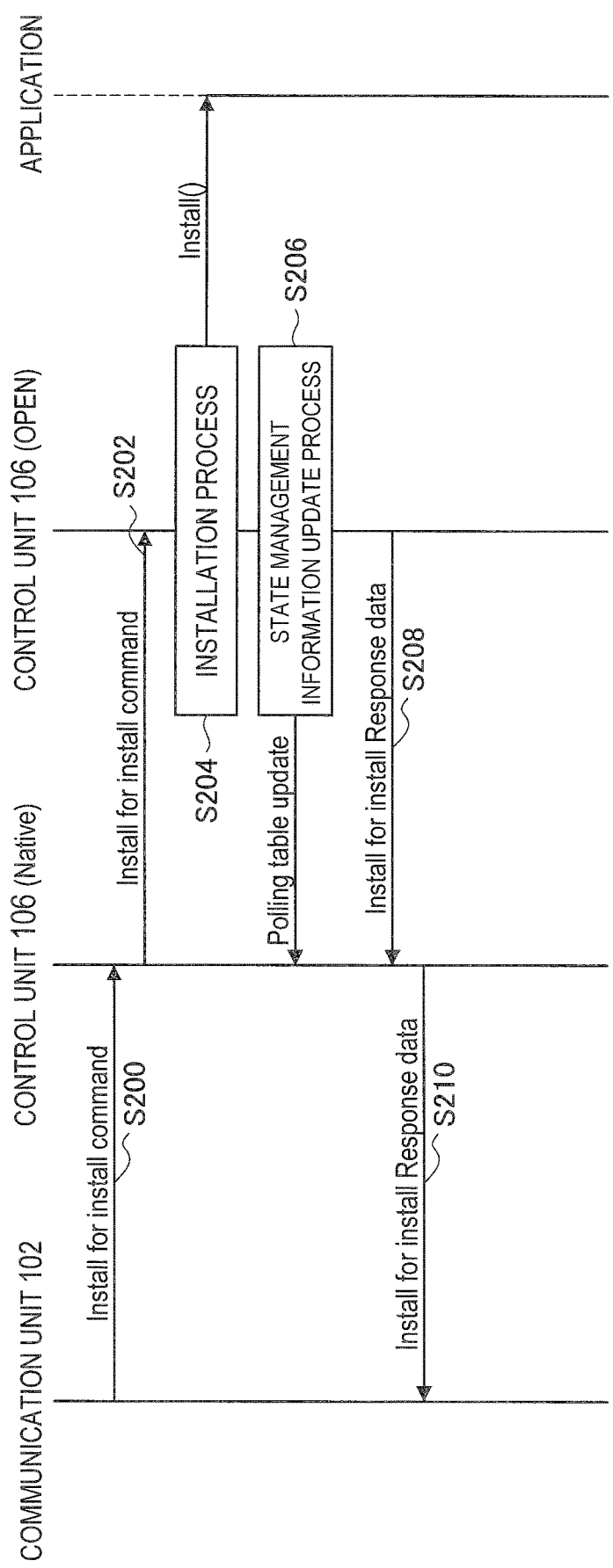
FIG. 14 is an explanatory diagram illustrating another example of the process related to the first example in the information processing device according to the embodiment.

FIG. 14 is an explanatory diagram illustrating another example of the process related to the first example in the information processing device 100 according to the embodiment. As in FIG. 12, FIG. 14 illustrates an example of a process when the information processing device 100 executes contactless communication with the reader/writer 200 illustrated in FIG. 10. As in FIG. 12, FIG. 14 illustrates an example of a process when applications are installed. In FIG. 14, a layer corresponding to "Native layer" (the example of the third layer) illustrated in FIG. 9 represents "the control unit 106 (Native)" and a layer corresponding to "Java Card RE layer" (the example of the second layer) illustrate in FIG. 9 represents "the control unit 106 (OPEN)."

In FIG. 14, the example of the processes of step S128 to step S134 illustrated in FIG. 12 is illustrated. Since the processes of step S100 to step S126 illustrated in FIG. 12 and the process of step S136 are the same as those of FIG. 12, these processes are omitted.

The communication unit 102 having received "Install for install command" transmitted from the reader/writer 200 transmits the received "Install for install command" to the control unit 106 (Native) (S200).

The control unit 106 (Native) having received "Install for install command" transmitted from the communication unit 102 in step S200 transmits the transmitted "Install for install command" to the control unit 106 (OPEN) (S202).

Based on the transmitted "Install for install command," the control unit 106 (OPEN) executes the application installation process as in step S130 of FIG. 12 (S204).

Based on "Install for install command," for example, the control unit 106 (OPEN) updates the state management information stored in the storage unit 104 (state management information update process in S206). Here, the control unit 106 (OPEN) causes the control unit 106 (Native) to update, for example, the state management information managed in the control unit 106 (Native) ("Polling table update" shown in step S206).

When the processes of steps S204 and S206 are executed, the control unit 106 (OPEN) transmits "Install for install Response data" indicating a process result to the control unit 106 (Native) (S208). Then, the control unit 106 (Native) transmits "Install for install Response data" to the communication unit 102 (S210).

When the applications are installed, the information processing device 100 can also execute, for example, the process illustrated in FIG. 14.

(ii) Second Example of Process in Information Processing Device 100

Figure 15:
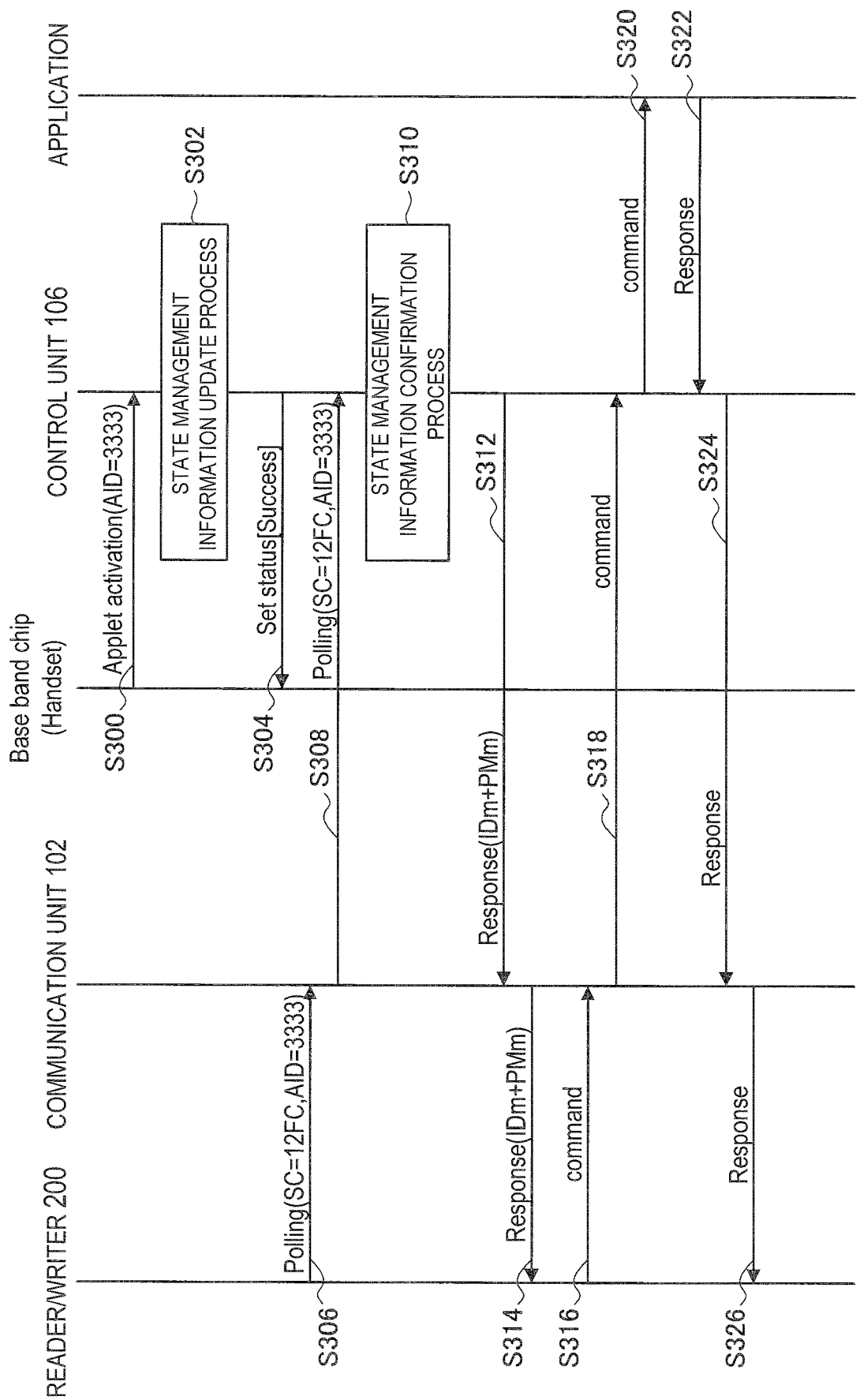
FIG. 15 is an explanatory diagram illustrating a second example of a process in the information processing device according to the embodiment.

FIG. 15 is an explanatory diagram illustrating a second example of the process in the information processing device 100 according to the embodiment. As in FIG. 12, FIG. 15 illustrates an example of a process when the information processing device 100 executes contactless communication with the reader/writer 200 illustrated in FIG. 10. FIG. 15 illustrates an example of a process when an application is considered to be in the valid state (Activated) based on a process command which is based on a user's operation on an operation unit (not illustrated). FIG. 15 illustrates an example in which an operation signal indicating a process command transmitted from the operation unit (not illustrated) is transmitted via a "Base band chip" which is an example of a device included in the second communication unit (not illustrated).

The Base band chip transmits "Applet activation (AID=3333)" which is a process command to cause an application with AID of 3333 to enter the valid state to the control unit 106 (S300).

The control unit 106 having received "Applet activation (AID=3333)" transmitted from the Base band chip in step S300 executes a process of adding (registering) the application information corresponding to the application with AID of 3333 to the state management information stored in, for example, the storage unit 104 based on "Applet activation (AID=3333)" (state management information update process in S302).

FIG. 16 is an explanatory diagram illustrating an example of a process related to the update of the state management information in the information processing device according to the embodiment. A illustrated in FIG. 16 indicates content of the state management information before the execution of the process of step S302 and B illustrated in FIG. 16 indicates content of the state management information after the execution of the process of step S302.

As indicated in A of FIG. 16, in the state management information before the execution of the process of step S302, the application information including the same system information as the system information "12FC" included in the application information corresponding to the application with AID of 3333 is not present. Accordingly, as indicated by B of FIG. 16, the application information corresponding to the application with AID of 3333 is added normally to the state management information by performing the process of step S302.

When the process of step S302 is completed, the control unit 106 transmits "Set status [Success]" indicating a process result to the Base band ship (S304).

For example, by executing the processes of step S300 to step S304, the application with AID of 3333 is considered to be set in the valid state (Activated) based on a process command based on a user's operation on the operation unit (not illustrated) in the information processing device 100.

Hereinafter, FIG. 15 illustrates an example of a process executed between the information processing device 100 and the reader/writer 200 when the application with AID of 3333 enters the valid state and the application is executed. In FIG. 15, a case in which the information processing device 100 is a device that executes the installed application will be exemplified.

The reader/writer 200 transmits a polling signal "Polling (SC=12FC, AID=3333)" (S306).

The communication unit 102 having received "Polling (SC=12FC, AID=3333)" transmitted from the reader/writer 200 in step S306 transmits the received "Polling (SC=12FC, AID=3333)" to the control unit 106 (S308).

The control unit 106 having received "Polling (SC=12FC, AID=3333)" transmitted from the communication unit 102 in step S308 executes a process of confirming the state management information stored in, for example, the storage unit 104 (state management information confirmation process in S310). Here, as the state management information confirmation process in the information processing device 100 according to the embodiment, for example, a process of checking whether the application information corresponding to the system information "12FC" indicated by the polling signal is included in the state management information can be exemplified.

Here, as indicated by B of FIG. 16, the application information corresponding to the system information "12FC" and AID "3333" indicated by the polling signal is included in the state management information. Accordingly, the control unit 106 transmits a response "Response (IDm+PMm)" including IDm and PMm in the application information corresponding to the system information "12FC" indicated by the polling signal to the communication unit 102 (S312).

The communication unit 102 having received "Response (IDm+PMm)" transmitted from the control unit 106 in step S312 transmits the received "Response (IDm+PMm)" through, for example, the load modulation (S314).

The reader/writer 200 having received "Response (IDm+PMm)" transmitted from the communication unit 102 in step S314 transmits a process command "command" used to cause the application to execute a process (S316).

The communication unit 102 having received "command" transmitted from the reader/writer 200 in step S316 transmits the received "command" to the control unit 106 (S318).

The control unit 106 having received "command" transmitted from the communication unit 102 in step S318 causes the application corresponding to "command" and stored in, for example, the storage unit 104 to execute the process according to "command" (S320).

When a response "Response" is transmitted from the application executing the process according to "command" in step S310 (S322), the control unit 106 transmits the transmitted "response" to the communication unit 102 (S324).

The communication unit 102 having received "Response" transmitted from the control unit 106 in step S324 transmits the received "Response" through, for example, the load modulation (S326).

When the application is considered to be set in the valid state (Activated) based on a process command which is based on a user's operation on the operation unit (not illustrated), the information processing device 100 performs, for example, the process illustrated in FIG. 15.

The process of the information processing device 100 when the application is considered to be set in the valid state (Activated) based on the process command which is based on the user's operation on the operation unit (not illustrated) is not limited to the process illustrated in FIG. 15.

For example, as described with reference to FIG. 9, the information processing device according to the embodiment can also manage the state management information copied from the state management information managed in "Java Card RE layer" (the example of the second layer), in "Native layer" (the example of the third layer), which is lower than "Java Card RE layer" (the example of the second layer).

In FIG. 15, the case in which the application information corresponding to the application indicated by the process command is normally added to the state management information in the state management information update process illustrated in step S302 has been exemplified. However, the application may not enter the valid state either due to, for example, occurrence of conflict shown in D of FIG. 2 in some cases.

Figure 17:
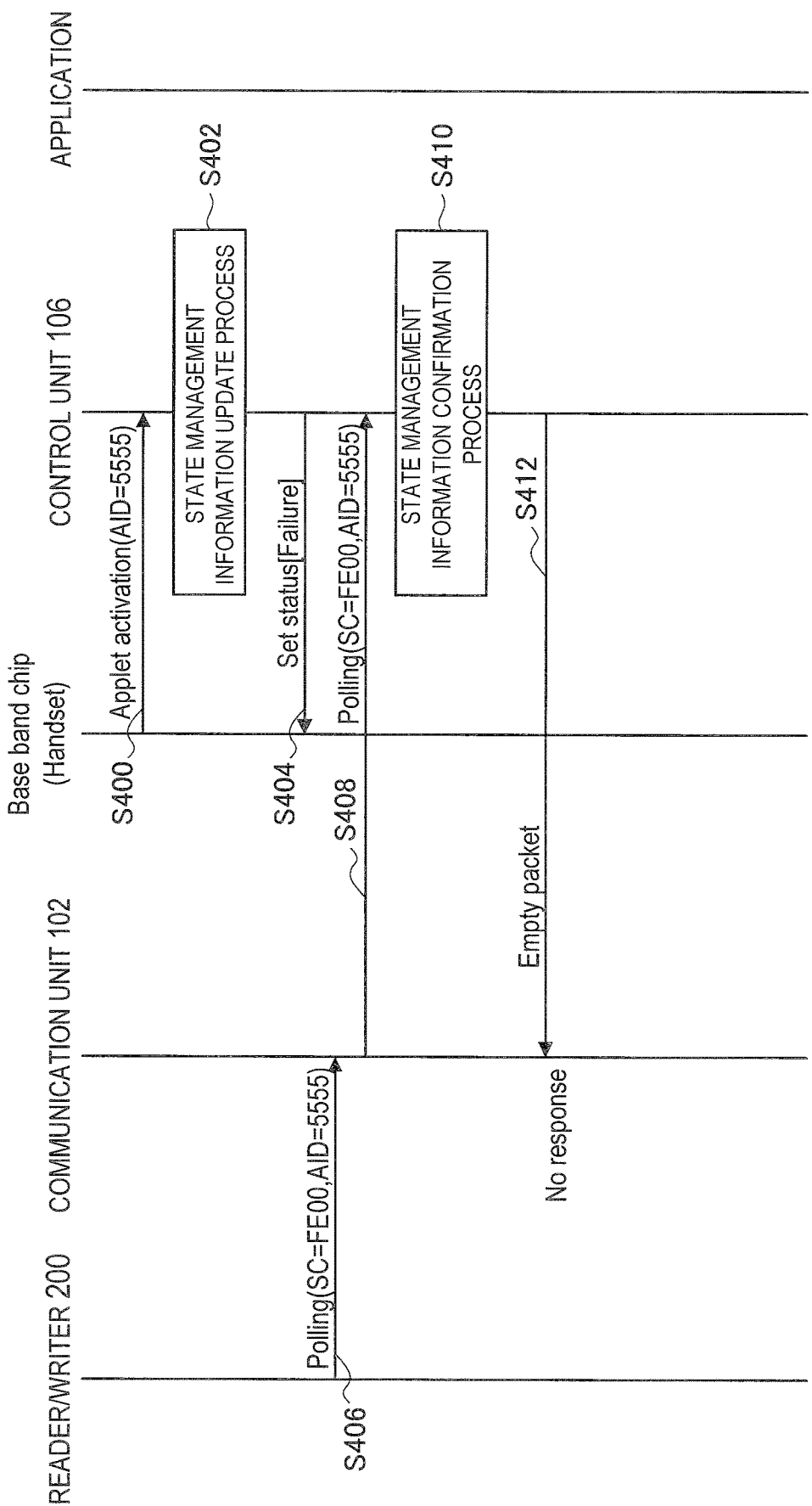
FIG. 17 is an explanatory diagram illustrating another example of the process related to the second example in the information processing device according to the embodiment.

FIG. 17 is an explanatory diagram illustrating another example of the process according to the second example in the information processing device 100 according to the embodiment. As in FIG. 15, FIG. 17 illustrates an example of a process when the information processing device 100 executes contactless communication with the reader/writer 200 illustrated in FIG. 10. As in FIG. 15, FIG. 17 illustrates an example of a process when an application is considered to be in the valid state (Activated) based on a process command which is based on a user's operation on an operation unit (not illustrated). As in FIG. 15, FIG. 17 illustrates an example in which an operation signal indicating a process command transmitted from the operation unit (not illustrated) is transmitted via a "Base band chip" which is an example of a device included in the second communication unit (not illustrated).

The Base band chip transmits "Applet activation (AID=5555)" which is a process command to cause an application with AID of 5555 to enter the valid state to the control unit 106 (S400).

The control unit 106 having received "Applet activation (AID=5555)" transmitted from the Base band chip in step S400 executes a process of adding (registering) the application information corresponding to the application with AID of 5555 to the state management information stored in, for example, the storage unit 104 based on "Applet activation (AID=5555)" (state management information update process in S302).

FIG. 18 is an explanatory diagram illustrating an example of a process related to the update of the state management information in the information processing device according to the embodiment. FIG. 18 illustrates content of the state management information before the execution of the process of step S402 and after the execution of the process of step S402.

When the system information included in the application information corresponding to an application with AID of 5555 is assumed to be "FE00," as illustrated in FIG. 18, the application information including the same system information as the system information "FE00" included in the application information corresponding to the application with AID of 5555 is present in the state management information before the execution of the process of step S402. Accordingly, as illustrated in FIG. 18, in the process of step S402, the application information corresponding to the application with AID of 5555 is not added to the state management information, as in the case indicated by D of FIG. 2. That is, even after the process of step S402 is executed, the application corresponding to the application with AID of 5555 remains in the invalid state (Deactivated).

When the process of step S402 is completed, the control unit 106 transmits "Set status [Failure]" indicating a process result to the Base band ship (S404).

For example, by executing the processes of step S400 to step S404, the application with AID of 5555 is considered to remain in the invalid state (Deactivated) in the information processing device 100.

Hereinafter, FIG. 17 illustrates an example of a process executed between the information processing device 100 and the reader/writer 200 when the application with AID of 5555 remains in the invalid state. In FIG. 17, a case in which the information processing device 100 is a device that executes the installed application will be exemplified.

The reader/writer 200 transmits a polling signal "Polling (SC=FE00, AID=5555)" (S406).

The communication unit 102 having received "Polling (SC=FE00, AID=5555)" transmitted from the reader/writer 200 in step S406 transmits the received "Polling (SC=FE00, AID=5555)" to the control unit 106 (S408).

The control unit 106 having received "Polling (SC=FC00, AID=5555)" transmitted from the communication unit 102 in step S408 executes a process of confirming the state management information stored in, for example, the storage unit 104, as in step S310 of FIG. 15 (state management information confirmation process in S410).

Here, as illustrated in FIG. 18, the application information corresponding to the system information "FE00" and AID "5555" indicated by the polling signal is not included in the state management information. Accordingly, the control unit 106 transmits, for example, "Empty packet" to the communication unit 102 (S412). When "Empty packet" is transmitted from the control unit 106 as in step S412, the communication unit 102 transmits no signal.

When the process is executed based on the process command based on the user's operation on the operation unit (not illustrated) and conflict shown in D of FIG. 2 occurs, the information processing device 100 performs, for example, the same process as the process illustrated in FIG. 17.

(iii) Third Example of Process in Information Processing Device 100

Figure 19:
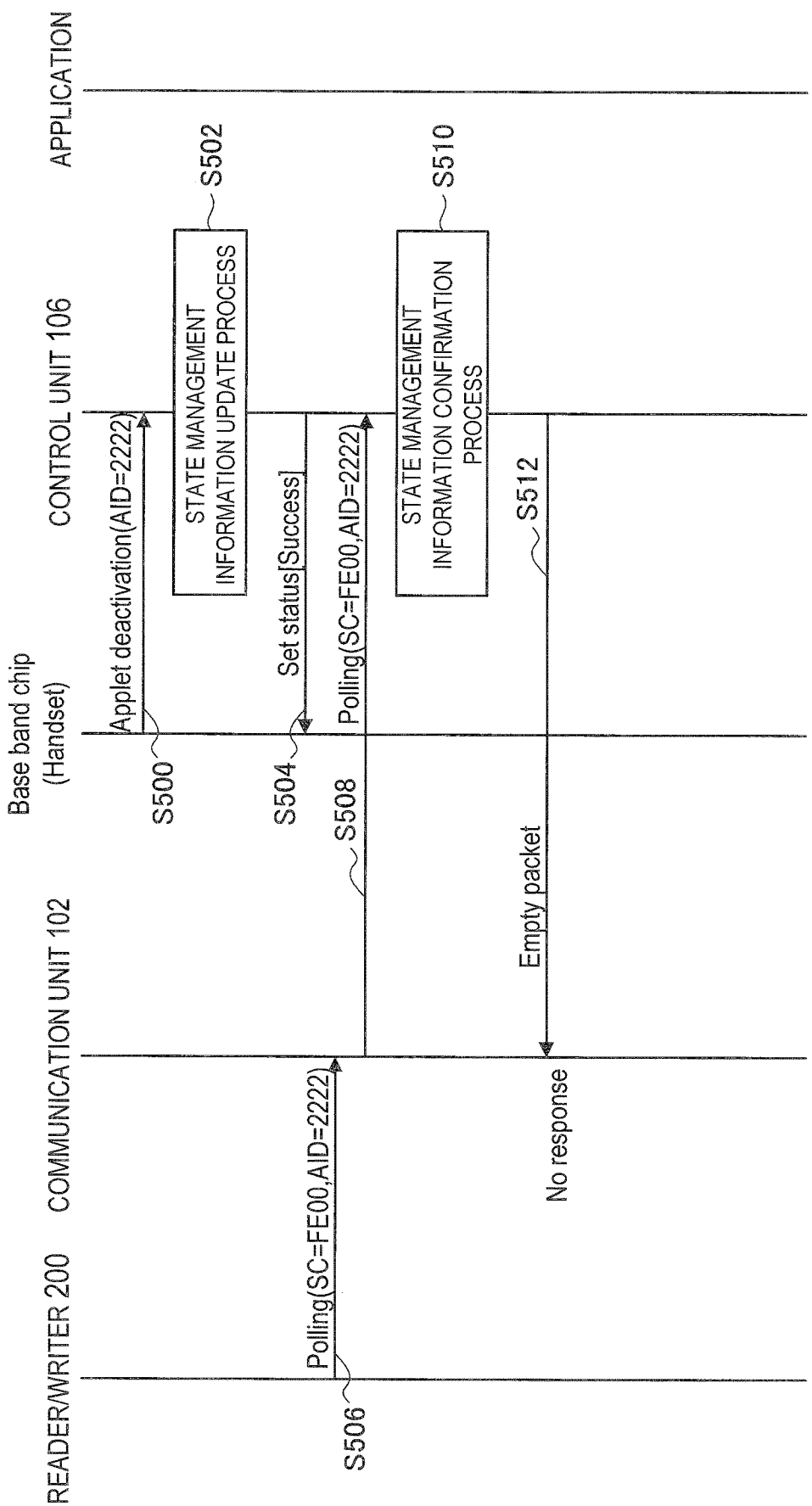
FIG. 19 is an explanatory diagram illustrating a third example of a process in the information processing device according to the embodiment.

FIG. 19 is an explanatory diagram illustrating a third example of the process in the information processing device 100 according to the embodiment. As in FIG. 12, FIG. 19 illustrates an example of a process when the information processing device 100 executes contactless communication with the reader/writer 200 illustrated in FIG. 10. FIG. 19 illustrates an example of a process when an application is considered to be in the invalid state (Deactivated) based on a process command which is based on a user's operation on an operation unit (not illustrated). As in FIG. 15, FIG. 19 illustrates an example in which an operation signal indicating a process command transmitted from the operation unit (not illustrated) is transmitted via a "Base band chip" which is an example of a device included in the second communication unit (not illustrated).

The Base band chip transmits "Applet deactivation (AID=2222)" which is a process command to cause an application with AID of 2222 to enter the valid state to the control unit 106 (S500).

The control unit 106 having received "Applet deactivation (AID=2222)" transmitted from the Base band chip in step S500 executes a process of deleting the application information corresponding to the application with AID of 2222 from the state management information stored in, for example, the storage unit 104 based on "Applet deactivation (AID=2222)" (state management information update process in S502).

FIG. 20 is an explanatory diagram illustrating an example of a process related to the update of the state management information in the information processing device according to the embodiment. A illustrated in FIG. 20 indicates content of the state management information before the execution of the process of step S502 and B illustrated in FIG. 20 indicates content of the state management information after the execution of the process of step S502.

As indicated by A of FIG. 20, the application information corresponding to an application with AID of 2222 is present in the state management information before execution of the process of step S502. Accordingly, as indicated by B of FIG. 20, the application information corresponding to the application with AID of 2222 is deleted normally from the state management information by executing the process of step S502.

As indicated by B of FIG. 20, the information processing device (the control unit included in the information processing device according to the embodiment) according to the embodiment may execute the management by deleting the application information corresponding to the application with AID of 2222 associated with priority level "2" from the state management information, and then by associating the application information corresponding to an application with AID of 3333 associated with priority level "3" with priority level "2." The information processing device (the control unit included in the information processing device) according to the embodiment can change the priority level, for example, by combining the process related to the deletion of the application information from the state management information and the process related to the addition of the application information to the state management information, as described above.

When the process of step S502 is completed, the control unit 106 transmits "Set status [Success]" indicating a process result to the Base band ship (S504).

For example, by executing the processes of step S500 to step S504, the application with AID of 2222 is considered to be set in the invalid state (Deactivated) based on a process command based on a user's operation on the operation unit (not illustrated) in the information processing device 100.

Hereinafter, FIG. 19 illustrates an example of a process executed between the information processing device 100 and the reader/writer 200 when the application with AID of 2222 comes into the invalid state. In FIG. 19, a case in which the information processing device 100 is a device that executes the installed application will be exemplified.

The reader/writer 200 transmits a polling signal "Polling (SC=FE00, AID=2222)" (S506).

The communication unit 102 having received "Polling (SC=FE00, AID=2222)" transmitted from the reader/writer 200 in step S506 transmits the received "Polling (SC=FE00, AID=5555)" to the control unit 106 (S508).

The control unit 106 having received "Polling (SC=FC00, AID=2222)" transmitted from the communication unit 102 in step S508 executes a process of confirming the state management information stored in, for example, the storage unit 104, as in step S310 of FIG. 15 (state management information confirmation process in S510).

Here, as illustrated in FIG. 20, the application information corresponding to the system information "FE00" and AID "2222" indicated by the polling signal is not included in the state management information. Accordingly, as in step S412 in FIG. 17, the control unit 106 transmits, for example, "Empty packet" to the communication unit 102 (S512). When "Empty packet" is transmitted from the control unit 106 as in step S512, the communication unit 102 transmits no signal.

When the application is considered to be set in the invalid state (Deactivated) based on a process command which is based on a user's operation on the operation unit (not illustrated), the information processing device 100 performs, for example, the process illustrated in FIG. 19.

The process of the information processing device 100 when the application is considered to be set in the invalid state (Deactivated) based on the process command which is based on the user's operation on the operation unit (not illustrated) is not limited to the process illustrated in FIG. 19.

For example, as described with reference to FIG. 9, the information processing device according to the embodiment can also manage the state management information copied from the state management information managed in "Java Card RE layer" (the example of the second layer), in "Native layer" (the example of the third layer), which is lower than "Java Card RE layer" (the example of the second layer).

(iii) Fourth Example of Process in Information Processing Device 100

Figure 21:
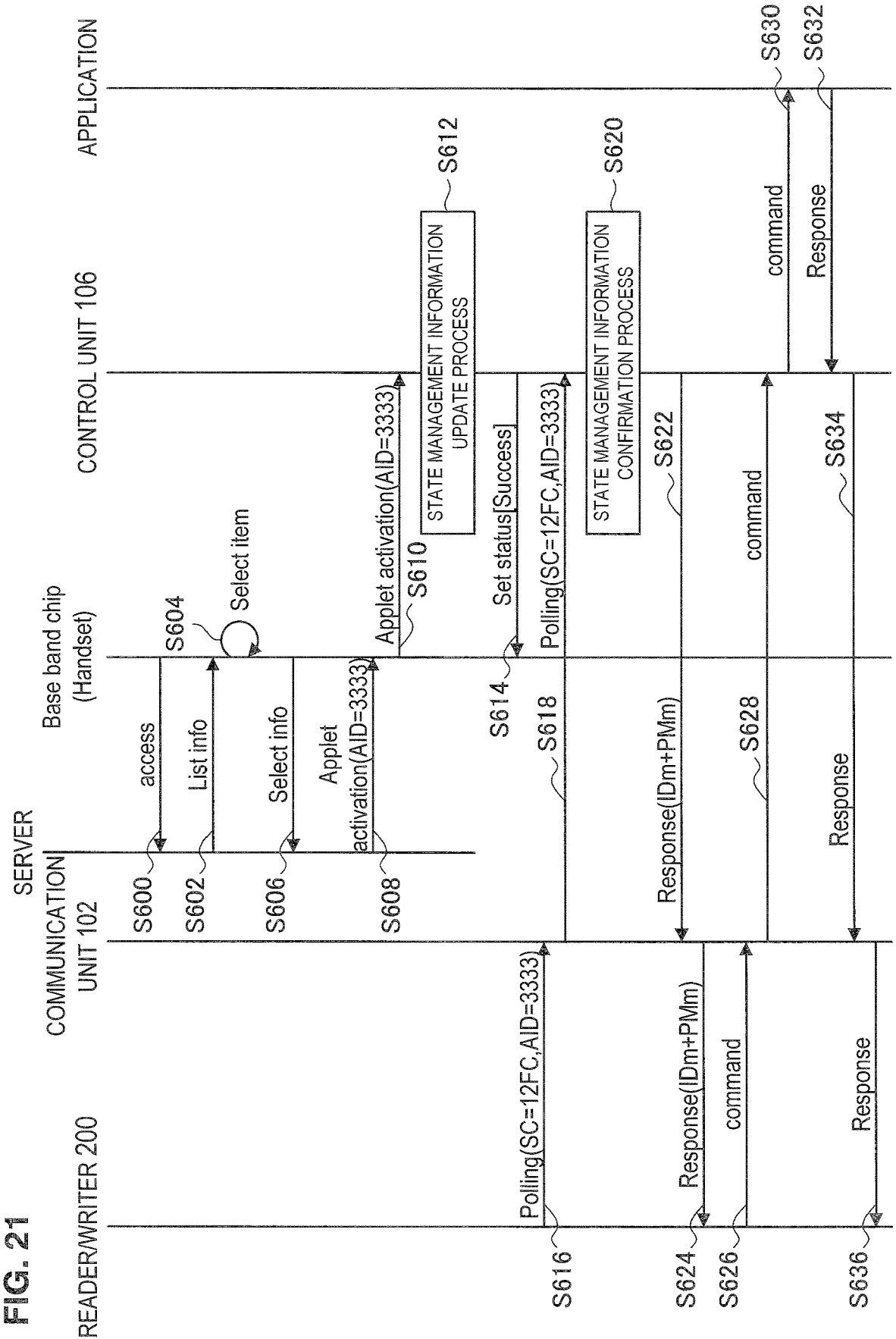
FIG. 21 is an explanatory diagram illustrating a fourth example of a process in the information processing device according to the embodiment.

FIG. 21 is an explanatory diagram illustrating a fourth example of the process in the information processing device 100 according to the embodiment. As in FIG. 12, FIG. 21 illustrates an example of a process when the information processing device 100 executes contactless communication with the reader/writer 200 illustrated in FIG. 10. FIG. 21 illustrates an example of a process when an application is considered to be set in the valid state (Activated) based on a process command transmitted from a server. FIG. 21 illustrates an example in which an operation signal indicating the process command transmitted from the server is transmitted via a "Base band chip" which is an example of a device included in the second communication unit (not illustrated). In FIG. 21, a case in which the "Base band chip" executes, for example, a process based on the operation signal according to the user's operation transmitted from the operation unit (not illustrated) will be exemplified.

The base band chip starts communication with the server (S600). When the communication starts in step S600, the server transmits data indicating a list of the applications which can be set in the valid state to the information processing device 100 (S602). When an operation signal indicating a selected application is transmitted from the operation unit (not illustrated), the Base band chip transmits data representing the selected application indicated by the operation signal to the server (S606).

The server transmits a process command "Applet deactivation (AID=3333)," which corresponds to the data representing the selected application that was transmitted in step S606 and is a process command to cause the application with AID of 3333 to enter the valid state, to the information processing device 100 (S608).

The Base band chip having received "Applet deactivation (AID=3333)" transmitted from the server in step S608 transmits the received "Applet deactivation (AID=3333)" to the control unit 106 (S610).

As in S302 illustrated in FIG. 15, the control unit 106 having received "Applet activation (AID=3333)" transmitted from the Base band chip in step S610 executes a process of adding (registering) the application information corresponding to the application with AID of 3333 to the state management information stored in, for example, the storage unit 104 based on "Applet activation (AID=3333)" (state management information update process in S612).

When content of the state management information before the execution of the process of step S612 is A illustrated in FIG. 16, the application information corresponding to the application with AID of 3333 is normally added to the state management information by executing the process of step S612, for example, as indicated by B of FIG. 16.

When the process of step S612 is completed, the control unit 106 transmits "Set status [Success]" indicating the process result to the Base band chip, as in S304 illustrated in FIG. 15 (S614).

For example, by executing the processes of step S600 to step S614, the application with AID of 3333 is considered to be set in the valid state (Activated) based on the process command transmitted from the server in the information processing device 100.

Hereinafter, FIG. 21 illustrates an example of a process executed between the information processing device 100 and the reader/writer 200 when the application with AID of 3333 enters the valid state and the application is executed. In FIG. 21, a case in which the information processing device 100 is a device that executes the installed application will be exemplified.

As in S306 illustrated in FIG. 15, he reader/writer 200 transmits a polling signal "Polling (SC=12FC, AID=3333)" (S616).

As in S308 illustrated in FIG. 15, the communication unit 102 having received "Polling (SC=12FC, AID=3333)" transmitted from the reader/writer 200 in step S616 transmits the received "Polling (SC=12FC, AID=3333)" to the control unit 106 (S618).

The control unit 106 having received "Polling (SC=12FC, AID=3333)" transmitted from the communication unit 102 in step S618 executes a process of confirming the state management information stored in, for example, the storage unit 104, as in step S310 illustrated FIG. 15 (state management information confirmation process in S620).

Here, when the content of the state management information after the execution of the process of step S612 is B of FIG. 16, the application information corresponding to the system information "12FC" and AID "3333" indicated by the polling signal is included in the state management information. Accordingly, as in S312 illustrated in FIG. 15, the control unit 106 transmits a response "Response (IDm+PMm)" including IDm and PMm in the application information corresponding to the system information "12FC" indicated by the polling signal to the communication unit 102 (S622).

As in S314 illustrated in FIG. 15, the communication unit 102 having received "Response (IDm+PMm)" transmitted from the control unit 106 in step S6222 transmits the received "Response (IDm+PMm)" through, for example, the load modulation (S624).

As in S316 illustrated in FIG. 15, the reader/writer 200 having received "Response (IDm+PMm)" transmitted from the communication unit 102 in step S624 transmits a process command "command" used to cause the application to execute a process (S626).

As in S318 illustrated in FIG. 15, the communication unit 102 having received "command" transmitted from the reader/writer 200 in step S626 transmits the received "command" to the control unit 106 (S628).

As in S320 illustrated in FIG. 15, the control unit 106 having received "command" transmitted from the communication unit 102 in step S628 causes the application corresponding to "command" and stored in, for example, the storage unit 104 to execute the process according to "command" (S630).

As in S324 illustrated in FIG. 15, then a response "Response" is transmitted from the application executing the process according to "command" in step S632 (S322), the control unit 106 transmits the transmitted "response" to the communication unit 102 (S634).

As in S326 illustrated in FIG. 15, the communication unit 102 having received "Response" transmitted from the control unit 106 in step S634 transmits the received "Response" through, for example, the load modulation (S636).

When the application is considered to be set in the valid state (Activated) based on the process command transmitted from the server, the information processing device 100 executes, for example, the process illustrated in FIG. 21.

The process of the information processing device 100 when the application is considered to be set in the valid state (Activated) based on the process command transmitted from the server is not limited to the process illustrated in FIG. 21.

For example, as described with reference to FIG. 9, the information processing device according to the embodiment can also manage the state management information copied from the state management information managed in "Java Card RE layer" (the example of the second layer), in "Native layer" (the example of the third layer), which is lower than "Java Card RE layer" (the example of the second layer).

The information processing device 100 according to the embodiment executes, for example, the processes described in the foregoing first to fourth examples. It is needless to say that examples of the process related to the information processing method in the information processing device 100 according to the embodiment are not limited to the examples described in the foregoing first to fourth examples.

As described above, for example, the information processing device 100 executes the process related to the information processing method according to the embodiment based on the process command which is based on the user's operation or the process command transmitted from the external device such as the reader/writer or the server. Here, specific examples of a trigger used for the information processing device 100 to start the process related to the information processing method according to the embodiment will be described. The information processing device 100 executes the process related to the information processing method according to the embodiment using, for example, cases described in (a) to (c) below as the triggers.

Case (a) is a case in which the user operates the operation unit (not illustrated), for example, to select an application set in the valid state or an application set in the invalid state among portable applications (for example, MIDlet) which are being executed.

Case (b) is a case in which a user moves a distance between the information processing device 100 (more precisely, the communication unit 102) and a specific reader/writer such as a reader/writer forming a Point Of Sale (POS) system to a distance in which contactless communication is possible and the contactless communication starts between the information processing device 100 and the reader/writer.

By starting the foregoing contactless communication, for example, a process command is transmitted to a CRS application which is being executed by the information processing device 100 and the CRS application causes an application corresponding to the process command to enter the valid state or the invalid state according to the process command.

When an error occurs in an application which is currently in the valid state and corresponds to certain system information, for example, the information processing device 100 may determine whether another application corresponding to the application information including the same system information is stored in the storage unit 104. When the other application corresponding to the same system information is present, for example, the information processing device 100 causes the application currently in the valid state to enter the invalid state and causes the other application to enter the valid state by combining the process related to the deletion of the application information from the state management information and the process related to the addition of the application information to the state management information.

More specifically, for example, when a signal indicating that an error transmitted from the reader/writer occurs is transmitted to the CRS application executed by the information processing device 100, the CRS application causes the application currently in the valid state to enter the invalid state and causes the other application to enter the valid state by combining the process related to the deletion of the application information from the state management information and the process related to the addition of the application information to the state management information (first specific example).

For example, when an error occurs in an application as a result of the execution of a process command by an application (an application currently in the valid state) and a signal indicating that an error occurs is transmitted from the application in which the error occurs to the CRS application executed by the information processing device 100, the CRS application causes the application currently in the valid state to enter the invalid state and causes the other application to enter the valid state by combining the process related to the deletion of the application information from the state management information and the process related to the addition of the application information to the state management information (second specific example).

For example, a CREL application of "Java Card Runtime Environment" can detect that an application enters the invalid state. Accordingly, when an error occurs in an application (an application currently in the valid state) as a result of execution of a process command by an application, the application may be set in the invalid state by initiatively executing the process related to the deletion of the application information from the state management information and the CREL application executed by the information processing device 100 and detecting that the application has entered the invalid state may cause the other application to enter the valid state by executing the process related to the addition of the application information to the state management information.

In the foregoing second and third specific examples, since the POS system side may not execute a special process of causing the other application to enter the valid state, compatibility with the POS system of the related art can be maintained by applying the foregoing second specific example.

Case (c) is a case in which a Short Message Service (SMS) is used.

For example, the SMS can be used from a home page (HP). For example, when the user designates an application to be set in the valid state or the invalid state on the HP providing an SMS (for example, inputting a telephone number and an application name), a process command is transmitted from a server providing the SMS. Then, the information processing device according to the embodiment causes an application corresponding to the process command to enter the valid state or the invalid state according to the process command For example, the HP providing the SMS may be displayed when the user activates a browser or may be displayed by a Smart Card Web Server (SCWS) present inside a Subscriber Identity Module (SIM).

The information processing device 100 has been exemplified in the embodiment, but the embodiment is not limited to the form. The embodiment can be applied to various devices, e.g., a communication device (or a portable communication device) such as a cellular phone or a smartphone, an Integrated Circuit (IC) card such as a Universal Integrated Circuit Card (UICC) card, a video/music reproduction device (or a video/music recording and reproducing device), a game device, or a computer such as a personal computer (PC). The embodiment can also be applied to, for example, a processing IC which can be embedded in the foregoing device.

(Program According to Embodiment)

A program (for example, a program executing the process related to the information processing method according to the embodiment) causing a computer to function as the information processing device according to the embodiment can control an installed application such that the valid state and the invalid state of the application are controlled.

The program according to the embodiment can also be applied to, for example, a program (or a program group), such as "Java Card Runtime Environment" illustrated in FIG. 1B, managing an application and realizing an execution environment.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the case in which the program (computer program) causing a computer to function as the information processing device according to the embodiment is provided has been described above, but the embodiments can provide a recording medium storing the foregoing program together.

The above-described configuration is an example of the embodiment and, of course, pertains to the technical scope of the present disclosure.

Additionally, the present technology may also be configured as below.

(1)

An information processing device including:

a storage unit configured to store applications, application information corresponding to each of the applications, and state management information in which the application information is stored in association with a priority level; and a control unit configured to control a valid state and an invalid state of the application by managing the application information stored in the state management information based on a process command (2)

The information processing device according to (1), wherein the control unit causes one application to enter a valid state by adding the application information corresponding to the one application to the state management information, and causes one application stored in the state management information to enter an invalid state by deleting the application information corresponding to the one application stored from the state management information.

(3)

The information processing device according to (2), wherein the application information includes system information used to identify a system in which the application is used, and wherein, when the system information included in the application information and corresponding to an application newly set in the valid state is included in the application information already stored in the state management information, the control unit does not add the application information corresponding to the application newly set in the valid state to the state management information.

(4)

The information processing device according to (2) or (3), wherein the control unit controls a priority level associated with the application information stored in the state management information through deletion of the application information from the state management information and addition of the application information to the state management information.

(5)

The information processing device according to any one of (1) to (4), wherein the control unit
manages the applications in a first layer, and
manages the application information corresponding to each of the applications and the state management information in a second layer which is lower than the first layer.

(6)

The information processing device according to (5), wherein the control unit further provides a third layer which is lower than the second layer, and
manages, in the third layer, the state management information copied from the state management information managed in the second layer.

(7)

The information processing device according to (6),
wherein the application information includes mode information regulating whether a response to a polling signal is given, and
wherein, when the control unit updates the mode information included in the state management information, the control unit updates the mode information included in the state management information managed in the third layer but does not update the mode information included in the state management information managed in the second layer.

(8)

The information processing device according to (7),
wherein the storage unit includes a volatile recording medium and a non-volatile recording medium,
wherein the mode information forming the application information included in the state management information is stored in the volatile recording medium, and
wherein, among information forming the application information included in the state management information, information excluding the mode information is stored in the non-volatile recording medium.

(9)

An information processing device including:
a storage unit configured to store applications, application information corresponding to each of the applications, and state management information in which the application information is stored in association with a priority level;
a control unit configured to control a valid state and an invalid state of the application by managing the application information stored in the state management information;
a communication unit configured to execute contactless communication with an external device; and
an operation unit configured to be operable by a user,
wherein the control unit controls the valid state and the invalid state of the application based on a process command received from the external device by the communication unit or a process command which is based on a user's operation transmitted from the operation unit.

(10)

An information processing device including:
a storage unit configured to store state management information in which application information is stored in association with a priority level; and
a control unit configured to control a valid state and an invalid state of the application by managing the application information stored in the state management information based on a process command (11)

An information processing method including:
a step of controlling valid states and invalid states of applications by managing, based on a process command, application information stored in state management information which is stored in a storage unit configured to store the applications, the application information corresponding to each of the applications, and the state management information in which the application information is stored in association with a priority level.

(12)

A program for causing a computer to execute:
a step of controlling valid states and invalid states of applications by managing, based on a process command, application information stored in state management information which is stored in a storage unit configured to store the applications, the application information corresponding to each of the applications, and the state management information in which the application information is stored in association with a priority level.

REFERENCE SIGNS LIST 100 information processing device
102 communication unit
104 storage unit
106 control unit
200 reader/writer

The invention claimed is:

1. An information processing device comprising:
a contactless communication unit configured to receive a polling signal from a device having a contactless integrated circuit (IC) chip;
a memory storing applications, application information corresponding to each of the applications, state management information and instructions;
a processor, wherein the instructions, which when executed by the processor, cause the processor to control, when the application information is included in the state management information:
accessing said application information stored in the state management information based on a designated priority level associated with the application information stored in the state management information, in accordance with a determination of whether a priority level is designated in the polling signal received from the device;
a valid state and an invalid state of the applications by managing the application information stored in the state management information based on a process command;
causing a first application of the applications to enter a valid state by adding the application information corresponding to the first application to the state management information; and
causing a second application of the applications for which the application information corresponding thereto is stored in the state management information to enter an invalid state by deleting the application information corresponding to the second application from the state management information,
wherein a user can operate a user interface (UI) to switch between (i) one of the applications corresponding to application information which (a) includes system information used to identify a system in which the one of the applications is used, and (b) is stored in the state management information, and (ii) another of the applications corresponding to application information which (a) includes the same system information as the one of the applications, and (b) is not stored in the state management information, by deleting from the state management information the application information corresponding to the one of the applications and adding to the state management information the application information corresponding to the another of the applications.

2. The information processing device according to claim 1, wherein, when the application information is stored in the state management information, the instructions, which when executed by the processor, cause the processor to control the priority level associated with the application information stored in the state management information through deletion of the application information from the state management information and addition of the application information to the state management information.

3. The information processing device according to claim 1, wherein, when the application information is stored in the state management information, the instructions, which when executed by the processor, cause the processor to control:
managing the applications in a first layer, and
managing the application information corresponding to each of the applications and the state management information in a second layer which is lower than the first layer.

4. The information processing device according to claim 3, wherein, when the application information is stored in the state management information, the instructions, which when executed by the processor, cause the processor to control
providing a third layer which is lower than the second layer, and
managing, in the third layer, the state management information copied from the state management information managed in the second layer.

5. The information processing device according to claim 4,
wherein the application information includes mode information regulating whether a response to a second polling signal is given, and
wherein, when the application information is stored in the state management information and the mode information included in the state management information is updated under control of the processor, the instructions, which when executed by the processor, cause the processor to control updating the mode information included in the state management information managed in the third layer and not updating the mode information included in the state management information managed in the second layer.

6. The information processing device according to claim 5,
wherein the memory includes a volatile recording medium and a non-volatile recording medium,
wherein the mode information forming the application information included in the state management information is stored in the volatile recording medium, and
wherein, among information forming the application information included in the state management information, information excluding the mode information is stored in the non-volatile recording medium.

7. The information processing device according to claim 1, wherein the instructions, which when executed by the processor, cause the processor to control managing the application information corresponding to each of the applications and the state management information in a same layer, in which the state management information includes information indicating the designated priority level, and in which the state management information is stored in the same layer in a table and the application information corresponding to each of the applications is stored in the same layer and external to the table.

8. An information processing method comprising:
storing, in a memory of an information processing device, applications, application information corresponding to each of the applications, and state management information;
receiving, by a contactless communication unit of the information processing device, a polling signal from a device having a contactless integrated circuit (IC) chip;
referring to said application information stored in the state management information based on designated priority level associated with the application information stored in the state management information, in accordance with a determination of whether a priority level is designated in the polling signal received from the device;
controlling a valid state and an invalid state of the applications by managing the application information stored in the state management information based on a process command;
causing a first application of the applications to enter a valid state by adding the application information corresponding to the first application to the state management information; and
causing a second application of the applications for which the application information corresponding thereto is stored in the state management information to enter an invalid state by deleting the application information corresponding to the second application from the state management information
wherein a user can operate a user interface (UI) to switch between (i) one of the applications corresponding to application information which (a) includes system information used to identify a system in which the one of the applications is used, and (b) is stored in the state management information, and (ii) another of the applications corresponding to application information which (a) includes the same system information as the one of the applications, and (b) is not stored in the state management information, by deleting from the state management information the application information corresponding to the one of the applications and adding to the state management information the application information corresponding to the another of the applications.

9. The information processing method according to claim 8, further comprising:
controlling the priority level associated with the application information stored in the state management information through deletion of the application information from the state management information and addition of the application information to the state management information.

10. The information processing method according to claim 8, further comprising:
managing the applications in a first layer, and
managing the application information corresponding to each of the applications and the state management information in a second layer which is lower than the first layer.

11. The information processing method according to claim 10, further comprising:
managing, in a third layer lower than the second layer, the state management information copied from the state management information managed in the second layer.

12. The information processing method according to claim 11,
  wherein the application information includes mode information regulating whether a response to a second polling signal is given, and
  the method further comprising:
    when the mode information included in the state management information is updated, updating the mode information included in the state management information managed in the third layer and not updating the mode information included in the state management information managed in the second layer.

13. The information processing method according to claim 12,
  wherein the storing is to a volatile recording medium and a non-volatile recording medium,
  wherein the mode information forming the application information included in the state management information is stored in the volatile recording medium, and
  wherein, among information forming the application information included in the state management information, information excluding the mode information is stored in the non-volatile recording medium.

14. A non-transitory storage medium having stored thereon a program for causing a computer to execute:
  storing, in a memory of an information processing device, applications, application information corresponding to each of the applications, and state management information;
  receiving, by a contactless communication unit of the information processing device, a polling signal from a device having a contactless integrated circuit (IC) chip;
  referring to said application information stored in the state management information based on designated priority level associated with the application information stored in the state management information, in accordance with a determination of whether a priority level is designated in the polling signal received from the device;
  controlling a valid state and an invalid state of the applications by managing the application information stored in the state management information based on a process command;
  causing a first application to enter a valid state by adding the application information corresponding to the first application to the state management information; and
  causing a second application of the applications for which the application information corresponding thereto is stored in the state management information to enter an invalid state by deleting the application information corresponding to the second application from the state management information
  wherein a user can operate a user interface (UI) to switch between (i) one of the applications corresponding to application information which (a) includes system information used to identify a system in which the one of the applications is used, and (b) is stored in the state management information, and (ii) another of the applications corresponding to application information which (a) includes the same system information as the one of the applications, and (b) is not stored in the state management information, by deleting from the state management information the application information corresponding to the one of the applications and adding to the state management information the application information corresponding to the another of the applications.

* * * * *